(12) United States Patent
Ming et al.

(10) Patent No.: US 12,449,900 B2
(45) Date of Patent: Oct. 21, 2025

(54) HUMAN-COMPUTER INTERACTION METHOD, HUMAN-COMPUTER INTERACTION APPARATUS, AND STORAGE MEDIUM

(71) Applicants: HUAWEI TECHNOLOGIES CO., LTD., Shenzhen (CN); Tianjin University, Tianjin (CN)

(72) Inventors: Dong Ming, Tianjin (CN); Yongbin Jiang, Beijing (CN); Minpeng Xu, Tianjin (CN); Pengkun Li, Shenzhen (CN); Xiaoyu Zhou, Tianjin (CN); Tao Hu, Beijing (CN)

(73) Assignees: Huawei Technologies Co., Ltd., Shenzhen (CN); Tianjin University, Tianjin (CN)

( * ) Notice: Subject to any disclaimer, the term of this patent is extended or adjusted under 35 U.S.C. 154(b) by 27 days.

(21) Appl. No.: 18/518,194

(22) Filed: Nov. 22, 2023

(65) Prior Publication Data

US 2024/0094816 A1 Mar. 21, 2024

Related U.S. Application Data

(63) Continuation of application No. PCT/CN2022/096920, filed on Jun. 2, 2022.

(30) Foreign Application Priority Data

May 24, 2021 (CN) .......................... 202110566088.3

(51) Int. Cl.
*G06F 3/01* (2006.01)
(52) U.S. Cl.
CPC .................................. *G06F 3/015* (2013.01)

(58) Field of Classification Search
None
See application file for complete search history.

(56) References Cited

U.S. PATENT DOCUMENTS

| 11,343,420 B1 * | 5/2022 | Herz ...................... G06F 3/0485 |
| 2016/0282940 A1 * | 9/2016 | Hong ........................ G06F 3/16 |

(Continued)

FOREIGN PATENT DOCUMENTS

| CN | 101464728 A | 6/2009 |
| CN | 101976115 A | 2/2011 |

(Continued)

OTHER PUBLICATIONS

Chen et al., "Application of a single-flicker online SSVEP BCI for spatial navigation," XP093175075, PLOS ONE vol. 12, No. 5, pp. 1-13 (May 31, 2017).

*Primary Examiner* — Matthew Yeung
(74) *Attorney, Agent, or Firm* — Leydig, Voit & Mayer, Ltd.

(57) ABSTRACT

A human-computer interaction method, a human-computer interaction apparatus, and a storage medium are provided. The method includes: displaying a human-computer interface, where the human-computer interface includes an operable object and a visual stimulus region; and executing a first operational command on the operable object, where the first operational command is determined based on a first signal, the first signal is an electroencephalography signal generated when a user gazes at a first region, the first region is one of a plurality of regions around the visual stimulus region, different electroencephalography signals are generated when the user gazes at different regions of the plurality of regions, and the different electroencephalography signals indicate to execute different operational commands related to the operable object. According to this application, the user does not (Continued)

need to gaze directly at a visual stimulus and can deliver different operational commands quickly, which improves user experience.

20 Claims, 20 Drawing Sheets

(56) References Cited

U.S. PATENT DOCUMENTS

2017/0123492 A1* 5/2017 Marggraff ........... G06F 3/04845
2023/0359275 A1* 11/2023 Barascud ............... A61B 5/378

FOREIGN PATENT DOCUMENTS

| CN | 103699216 A | 4/2014 |
| CN | 111571587 A | 8/2020 |
| CN | 112882567 A | 6/2021 |
| KR | 20190056287 A | 5/2019 |

* cited by examiner

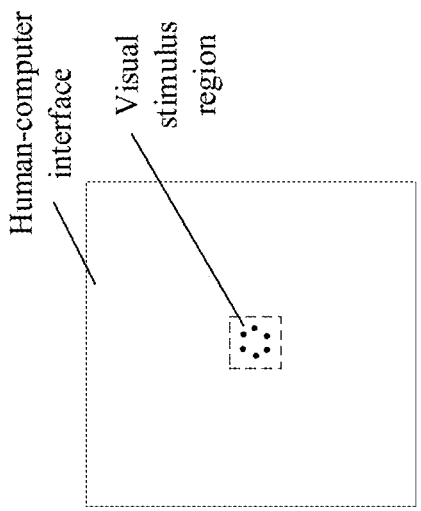
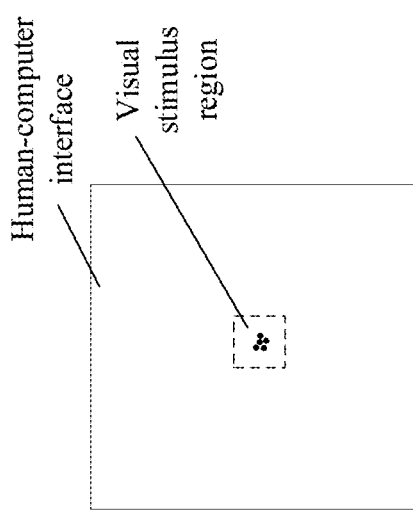
FIG. 11
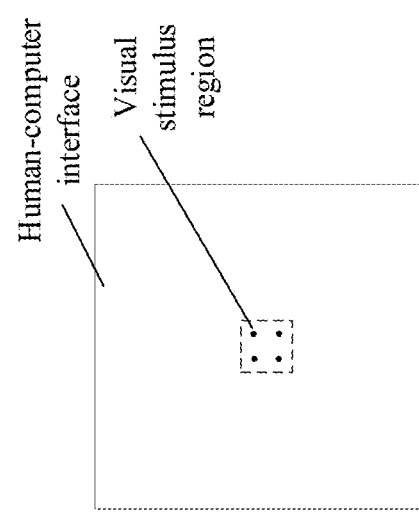

HUMAN-COMPUTER INTERACTION METHOD, HUMAN-COMPUTER INTERACTION APPARATUS, AND STORAGE MEDIUM

CROSS-REFERENCE TO RELATED APPLICATIONS

This application is a continuation of International Application No. PCT/CN2022/096920, filed on Jun. 2, 2022, which claims priority to Chinese Patent Application No. 202110566088.3, filed on May 24, 2021. The disclosures of the aforementioned applications are hereby incorporated by reference in their entireties.

TECHNICAL FIELD

Embodiments of this application relate to the field of human-computer interaction technologies, and in particular, to a human-computer interaction method, a human-computer interaction apparatus, and a storage medium.

BACKGROUND

A brain-computer interface (BCI) is a novel human-computer interaction manner that is based on neuroscience and engineering technologies. A direct communication and control channel can be established between a human brain and a computer or another electronic device by obtaining and analyzing brain signals in real time, to directly translate activities of a central nervous system into information output.

As BCI technologies continuously develop and attract widespread attention, many brain information detection technologies are applied to BCI systems. Electroencephalography (EEG) signals are a first choice non-invasive BCI technology at a current stage because of the following advantages: capable of directly reflecting electrophysiological activity information of a brain, having a high temporal resolution, and a collection device likely to be lightweight.

The electroencephalography signals are characterized by non-linearity and non-stationarity. Therefore, extracting weak electroencephalography signal characteristics from complex background electroencephalography signals is one of important technologies of the BCI systems. An event-related potential (ERP) is a measurement of a psychological response in a brain to a specific sensory, cognitive, or motor event or the like from an external environment. In a fixed incubation period after a small probability event (stimulation) occurs, a corresponding peak occurs in a cerebral cortex of a human. Therefore, the ERP is of great value in both clinical and practical applications.

ERP-based visual positioning is one of applications in the field of the brain-computer interface, such as text input and delivery of a robot movement instruction. A principle thereof is to evoke generation of an ERP component in an electroencephalography signal of a user by performing visual stimulation on the user. Because an ERP waveform is strictly time-locked to stimulation, the ERP component can be obtained by using a superimposing and averaging method; a timing relationship between the visual stimulation and the ERP component can be further analyzed, to identify a position of a visual stimulus, that is, implement visual positioning; and delivering of an operational instruction by the user is completed.

However, in an application scenario of the existing BCI technology, one visual stimulus corresponds to one executable operational command. If a plurality of operational commands need to be executed, the user needs to gaze at a plurality of visual stimuli, likely causing visual fatigue to the user. In addition, if a plurality of commands need to be supported in a short identification time with high identification accuracy, there is a significant challenge facing the existing technical solution.

SUMMARY

This application discloses a human-computer interaction method, a human-computer interaction apparatus, and a storage medium, so that a user does not need to gaze directly at a visual stimulus and can deliver different operational commands quickly, relieving visual fatigue of the user and improving user experience.

According to a first aspect, this application provides a human-computer interaction method. The method includes: displaying a human-computer interface, where the human-computer interface includes an operable object and a visual stimulus region; and executing a first operational command on the operable object, where the first operational command is determined based on a first signal, the first signal is an electroencephalography signal generated when a user gazes at a first region, the first region is one of a plurality of regions around the visual stimulus region, different electroencephalography signals are generated when the user gazes at different regions of the plurality of regions, and the different electroencephalography signals indicate to execute different operational commands related to the operable object.

Optionally, an included angle between a line of sight obtained when the user gazes at the first region and a line of sight obtained when the user gazes at a center point of the visual stimulus region is in a preset range. For example, the included angle is not greater than 5°. This can ensure that visual stimulation caused by the visual stimulus region to the user is strong enough to evoke an electroencephalography signal of high strength.

In this application, when intending to deliver an operational command, the user does not need to gaze directly at the visual stimulus region. The user can deliver the command by gazing at a region around the visual stimulus region. Compared with an existing technical solution in which a user needs to gaze directly at a visual stimulus region to deliver an operational command, the technical solution in this application can help relieve visual fatigue of the user and improve user experience in a human-computer interaction process. In addition, in this application, when the user gazes at different regions around the visual stimulus region, different electroencephalography signals can be evoked. Therefore, it may be set that the user gazing at different regions around the visual stimulus region indicates that the user intends to deliver different operational commands. To be specific, in this application, it can be implemented that a single visual stimulus corresponds to a plurality of operational commands. When the user needs to continuously deliver a plurality of operational commands, the user does not need to gaze at a plurality of visual stimulus regions. The user can continuously deliver a plurality of operational commands only by gazing at a plurality of regions around the visual stimulus region according to operational intent of the user, reducing operational complexity and improving user experience. Moreover, in the existing solution, one visual stimulus corresponds to one operational command. When there are a plurality of operational commands, a same quantity of visual stimuli need to be displayed in a human-computer interface, increasing a burden on a processor and being complex to implement. In this application, it can be implemented that a single visual stimulus corresponds to a plurality of operational commands. Therefore, a quantity of visual stimulus regions displayed in a human-computer interface can be reduced, a burden on the processor can also be reduced, it is easier to implement, and it is easy to operate.

In a possible implementation, the different electroencephalography signals are evoked in different regions in a primary visual cortex when the user gazes at the different regions, and the first region is determined based on a region in which the first signal appears in the primary visual cortex.

In this application, a function that a single visual stimulus corresponds to a plurality of operational commands may be implemented based on a retina-cortex mapping principle. In the principle, when a visual stimulus is in different positions in a field of view of a user, electroencephalography signals with different spatiotemporal distribution characteristics can be evoked. To be specific, when the user gazes at different regions around a visual stimulus region in a human-computer interface, corresponding electroencephalography signals can be evoked in different regions in a primary visual cortex of a brain. A position or region at which the user gazes can be determined by identifying spatiotemporal distribution characteristics of collected electroencephalography signals. In this way, an operational intent of the user is obtained through analysis.

In a possible implementation, a visual stimulation pattern in the visual stimulus region includes a blinking stimulation pattern, a motion stimulation pattern, an element jump stimulation pattern, or a hybrid stimulation pattern. The hybrid stimulation pattern is a stimulation pattern in which at least two patterns of the blinking stimulation pattern, the motion stimulation pattern, and the element jump stimulation pattern are combined.

The blinking stimulation pattern is a stimulation pattern in which a visual stimulus constituent element in the visual stimulus region sometimes appears and sometimes disappears. The motion stimulation pattern is a stimulation pattern in which a visual stimulus constituent element in the visual stimulus region moves in a preset direction and on a preset trajectory. The element jump stimulation pattern is a stimulation pattern in which at least one of a shape, a color, and shading of a visual stimulus constituent element in the visual stimulus region continuously changes.

Optionally, the visual stimulus constituent element has at least one of the following characteristics: a first characteristic that the visual stimulus constituent element is in a shape of a geometric graphic, or a graphic obtained through any combination or deformation of geometric graphics; and a second characteristic that the color of the visual stimulus constituent element is one of three primary colors in optics, or a color obtained by superimposing at least two of the three primary colors in optics in any proportion.

In this application, the visual stimulation patterns are designed, improving novelty of visual stimulation, further evoking electroencephalography signals with high signal-to-noise ratios, increasing accuracy in identifying different electroencephalography signal characteristics, and further increasing accuracy in identifying the operational intent of the user.

In a possible implementation, the hybrid stimulation pattern includes a stimulation pattern in which at least two stimulation patterns of the blinking stimulation pattern, the motion stimulation pattern, and the element jump stimulation pattern are presented alternately.

In this application, vision of the user is stimulated in the hybrid stimulation pattern, further improving novelty of visual stimulation, and reducing a repetition-caused suppression effect, that is, inhibiting an effect that an electroencephalography signal is attenuated due to repeated displays of a same stimulation pattern.

In a possible implementation, the at least two stimulation patterns include a first stimulation pattern, the first stimulation pattern is one of the blinking stimulation pattern, the motion stimulation pattern, and the element jump stimulation pattern, and the first stimulation pattern is displayed at least twice, where visual stimuli presented when the first stimulation pattern is displayed for the first time and the second time are different.

Optionally, that visual stimuli are different may be that visual stimulus constituent elements are different in one or more of color, shape, and shading, or the like.

In this application, for a case in which a visual stimulus of a same visual stimulation pattern appears a plurality of times, it is designed that different visual stimuli appear at different times, further improving novelty of visual stimulation and evoking electroencephalography signals with high signal-to-noise ratios.

In a possible implementation, the visual stimulus region is in a range of a 2-degree viewing angle of the user. The visual stimulus region designed in this way is small in size and provides low stimulation strength, reducing strong stimulation to the vision of the user and reducing visual fatigue of the user.

In a possible implementation, a size of the visual stimulus region increases as a distance between eyes of the user and the human-computer interface increases, and/or decreases as the distance between the eyes of the user and the human-computer interface decreases. This design can ensure that when stimulation strength is sufficient, neither of the following cases occurs: a case in which electroencephalography signals with high signal-to-noise ratios are not evoked due to weak visual stimulation that results from an excessively long distance, and a case in which the user feels visual fatigue due to excessively strong visual stimulation that results from an excessively short distance.

In a possible implementation, the visual stimulus region overlaps a display region of the operable object, the plurality of regions are regions that are distributed in a plurality of directions centering around the visual stimulus region, the first region is a region distributed in a first direction, and the first direction is one of the plurality of directions.

In this application, the visual stimulus region is designed to overlap the display region of the operable object, and the user may gaze at the regions that are in the plurality of different directions centering around the visual stimulus region, to deliver different operational commands to the operable object. In this way, the function that a single visual stimulus corresponds to a plurality of operational commands is implemented.

In a possible implementation, the regions in the plurality of directions include at least one auxiliary graphic, the at least one auxiliary graphic is configured to indicate a position for gazing to the user, the first region includes a first auxiliary graphic of the at least one auxiliary graphic, and the first signal is an electroencephalography signal generated when the user gazes at the first auxiliary graphic.

In this application, an auxiliary graphic may be configured to indicate a position at which the user gazes, quickly helping a novice user master a human-computer interface interaction method, and improving user experience.

In a possible implementation, the first operational command instructs the operable object to move in the first direction.

In this application, because the visual stimulus region overlaps the display region of the operable object, the user may gaze at a region that is in any of the plurality of directions around the visual stimulus region, to deliver a command that instructs the operable object to move towards the direction of gaze.

In a possible implementation, the first operational command instructs to resize the display region of the operable object towards the first direction.

In this application, because the visual stimulus region overlaps the display region of the operable object, the user may gaze at a region that is in any of the plurality of directions around the visual stimulus region, to deliver a command that instructs to resize the display region of the operable object towards the direction of gaze.

In a possible implementation, the human-computer interface includes a plurality of visual stimulus regions, the first signal includes a plurality of electroencephalography signals that are generated when the plurality of visual stimulus regions stimulate the vision of the user, and the plurality of electroencephalography signals separately indicate positional relationships between the first region and the plurality of visual stimulus regions.

In this application, a plurality of visual stimulus regions may be deployed in the human-computer interface. The position or region at which the user gazes can be located based on a combination of the plurality of visual stimulus regions. Specifically, when the user gazes at a position or region in the human-computer interface, a plurality of visual stimulus regions around the position or region can evoke a plurality of electroencephalography signals with different spatiotemporal distribution characteristics based on the retina-cortex mapping principle. Based on the plurality of electroencephalography signals, spatial directions in which the position or region is relative to the plurality of visual stimulus regions can be determined. Further, the position or region is located, the operational intent of the user can be identified, and a corresponding operational command is executed.

In a possible implementation, the first region includes a first sub-region and a second sub-region, the plurality of electroencephalography signals include a first sub-signal and a second sub-signal, the first sub-signal is an electroencephalography signal generated when the user gazes at the first sub-region, the second sub-signal is an electroencephalography signal generated when the user gazes at the second sub-region, the first sub-signal precedes the second sub-signal, and that the first operational command is determined based on a first signal includes that the first operational command is determined based on both the first sub-signal and the second sub-signal.

In this application, based on a principle of locating, based on a combination of the plurality of visual stimulus regions, the region at which the user gazes, the user may deliver a specific operational command by gazing at two sub-regions in the human-computer interface.

In a possible implementation, the first region is the display region of the operable object, and the executing a first operational command on the operable object includes: executing a select operational command on the operable object.

Optionally, the select operation command may be, for example, highlighting, underlining, enhancing image rendering, adding a shadow or shading, or framing a rectangle.

In this application, the region at which the user gazes is the display region of the operable object. The region at which the user gazes can be located based on a combination of the plurality of visual stimuli, and further, the select operation may be executed on the operable object.

In a possible implementation, the human-computer interface is in a shape of a polygon, and some or all of the plurality of visual stimulus regions are provided in regions in which a plurality of interior angles of the polygon lie.

In this application, the visual stimulus regions are provided around the human-computer interface. Based on the retina-cortex mapping principle any position at which the user gazes in the human-computer interface can be located based on a combination of the plurality of visual stimulus regions.

In a possible implementation, the method further includes: changing the visual stimulation pattern in the visual stimulus region based on an electroencephalography characteristic of the user.

In this application, the visual stimulation pattern displayed in the human-computer interface is adjusted adaptively, to match the user with a visual stimulation pattern to which the user is highly sensitive. In this way, user electroencephalography signals with high signal-to-noise ratios can be evoked, increasing accuracy in identifying spatiotemporal distribution characteristics of electroencephalography signals, and further increasing accuracy in identifying an intended operational command of the user.

According to a second aspect, this application provides a human-computer interaction apparatus. The apparatus includes:

a display unit, configured to display a human-computer interface, where the human-computer interface includes an operable object and a visual stimulus region; and a processing unit, configured to execute a first operational command on the operable object, where the first operational command is determined based on a first signal, the first signal is an electroencephalography signal generated when a user gazes at a first region, the first region is one of a plurality of regions around the visual stimulus region, different electroencephalography signals are generated when the user gazes at different regions of the plurality of regions, and the different electroencephalography signals indicate to execute different operational commands related to the operable object.

Optionally, an included angle between a line of sight obtained when the user gazes at the first region and a line of sight obtained when the user gazes at a center point of the visual stimulus region is in a preset range. For example, the included angle is not greater than 5°. This can ensure that visual stimulation caused by the visual stimulus region to the user is strong enough to evoke an electroencephalography signal of high strength.

In a possible implementation, the different electroencephalography signals appear in different regions in a primary visual cortex, and the first region is determined based on a region in which the electroencephalography signal appears in the primary visual cortex.

In a possible implementation, a visual stimulation pattern in the visual stimulus region includes a blinking stimulation pattern, a motion stimulation pattern, an element jump stimulation pattern, or a hybrid stimulation pattern. The hybrid stimulation pattern is a stimulation pattern in which at least two patterns of the blinking stimulation pattern, the motion stimulation pattern, and the element jump stimulation pattern are combined.

The blinking stimulation pattern is a stimulation pattern in which a visual stimulus constituent element in the visual stimulus region sometimes appears and sometimes disappears. The motion stimulation pattern is a stimulation pattern in which a visual stimulus constituent element in the visual stimulus region moves in a preset direction and on a preset trajectory. The element jump stimulation pattern is a stimulation pattern in which at least one of a shape, a color, and shading of a visual stimulus constituent element in the visual stimulus region continuously changes.

In a possible implementation, the hybrid stimulation pattern includes a stimulation pattern in which at least two stimulation patterns of the blinking stimulation pattern, the motion stimulation pattern, and the element jump stimulation pattern are presented alternately.

In a possible implementation, the at least two stimulation patterns include a first stimulation pattern, and the first stimulation pattern is one of the blinking stimulation pattern, the motion stimulation pattern, and the element jump stimulation pattern; and
  the first stimulation pattern is displayed at least twice, where visual stimuli presented when the first stimulation pattern is displayed for the first time and the second time are different.

In a possible implementation, the visual stimulus region is in a range of a 2-degree viewing angle of the user.

In a possible implementation, a size of the visual stimulus region increases as a distance between eyes of the user and the human-computer interface increases, and/or decreases as the distance between the eyes of the user and the human-computer interface decreases.

In a possible implementation, the visual stimulus region overlaps a display region of the operable object, the plurality of regions are regions that are distributed in a plurality of directions centering around the visual stimulus region, the first region is a region distributed in a first direction, and the first direction is one of the plurality of directions.

In a possible implementation, the regions in the plurality of directions include at least one auxiliary graphic, the at least one auxiliary graphic is configured to indicate a position for gazing to the user, the first region includes a first auxiliary graphic of the at least one auxiliary graphic, and the first signal is an electroencephalography signal generated when the user gazes at the first auxiliary graphic.

In a possible implementation, the first operational command instructs the operable object to move in the first direction.

In a possible implementation, the first operational command instructs to resize the display region of the operable object towards the first direction.

In a possible implementation, the human-computer interface includes a plurality of visual stimulus regions, the first signal includes a plurality of electroencephalography signals that are generated when the plurality of visual stimulus regions stimulate vision of the user, and the plurality of electroencephalography signals separately indicate positional relationships between the first region and the plurality of visual stimulus regions.

In a possible implementation, the first region includes a first sub-region and a second sub-region, the plurality of electroencephalography signals include a first sub-signal and a second sub-signal, the first sub-signal is an electroencephalography signal generated when the user gazes at the first sub-region, the second sub-signal is an electroencephalography signal generated when the user gazes at the second sub-region, the first sub-signal precedes the second sub-signal, and that the first operational command is determined based on a first signal includes that the first operational command is determined based on both the first sub-signal and the second sub-signal.

In a possible implementation, the first region is the display region of the operable object, and the executing a first operational command on the operable object includes: executing a select operational command on the operable object.

In a possible implementation, the human-computer interface is in a shape of a polygon, and some or all of the plurality of visual stimulus regions are provided in regions in which a plurality of interior angles of the polygon lie.

In a possible implementation, the processing unit is further configured to: change the visual stimulation pattern in the visual stimulus region based on an electroencephalography characteristic of the user.

According to a third aspect, this application provides a human-computer interaction apparatus. The apparatus may include a processor and a memory, and is configured to implement the human-computer interaction method described in the first aspect and the possible implementations of the first aspect. The memory is coupled to the processor. When executing a computer program stored in the memory, the processor can implement the method according to any one of the first aspect or the possible implementations of the first aspect. The apparatus may further include a communication interface. The communication interface is configured for the apparatus to communicate with another apparatus. For example, the communication interface may be a transceiver, a circuit, a bus, a module, or another type of communication interface. The communication interface includes a receive interface and a transmit interface. The receive interface is configured to receive messages. The transmit interface is configured to transmit messages.

In a possible implementation, the apparatus may include:
  the memory, configured to store a computer program; and
  the processor, configured to: display a human-computer interface, where the human-computer interface includes an operable object and a visual stimulus region; and execute a first operational command on the operable object, where the first operational command is determined based on a first signal, the first signal is an electroencephalography signal generated when a user gazes at a first region, the first region is one of a plurality of regions around the visual stimulus region, different electroencephalography signals are generated when the user gazes at different regions of the plurality of regions, and the different electroencephalography signals indicate to execute different operational commands related to the operable object.

It should be noted that in this application, the computer program in the memory may be stored in advance, or may be stored after being downloaded from the internet when the apparatus is used. A source of the computer program in the memory is not specifically limited in this application. The coupling in this embodiment of this application is indirect coupling or connection between apparatuses, units, or modules for information exchange between the apparatuses, the units, or the modules, and may be in electrical, mechanical, or other forms.

According to a fourth aspect, this application provides a computer-readable storage medium. The computer-readable storage medium stores a computer program. The computer program is executed by a processor to implement the method according to any one of the first aspect and the possible implementations of the first aspect.

According to a fifth aspect, this application provides a computer program product. When the computer program product is run on a computer, the computer is enabled to perform the method according to any one of the first aspect and the possible implementations of the first aspect.

It may be understood that the apparatuses according to the second aspect and the third aspect, the computer-readable storage medium according to the fourth aspect, and the computer program product according to the fifth aspect provided above are all configured to perform the method according to any one of the first aspect. Therefore, for beneficial effects that can be achieved by the apparatuses, the computer-readable storage medium, and the computer program product, refer to beneficial effects of the corresponding method. Details are not described herein again.

BRIEF DESCRIPTION OF DRAWINGS

The following describes accompanying drawings used in embodiments of this application.

FIG. 10 and FIG. 11 are schematic diagrams of visual stimuli according to this application;

DESCRIPTION OF EMBODIMENTS

The following describes embodiments of this application with reference to the accompanying drawings in embodiments of this application. Terms used in implementations of embodiments of this application are merely used to explain specific embodiments of this application rather than being intended to limit this application.

The following first describes related concepts used in this application.

1. Event-Related Potential (ERP)

An event-related potential ERP is a voltage fluctuation related to a specific physical or psychological event in time. The event-related potential ERP is a special brain evoked potential. Evoked potentials (EPS), also referred to as evoked responses, are bioelectric responses. When specific stimulation is applied to a nervous system (from a receptor to a cerebral cortex), or a brain is made process information about stimulation (positive or negative), a bioelectric response is generated in a corresponding position in the nervous system and the brain. The bioelectric response is detectable and has a specific phase, and there is a fixed time interval (time-locked relationship) between the bioelectric response and the stimulation. The potential or electrical response can be recorded extracranially, and can be extracted from an electroencephalography signal using filtering and signal superimposing techniques.

2. Visual Evoked Potential (VEPs)

Being a type of event-related potentials ERP, VEPs are bioelectric responses evoked by visual stimulation in an occipital region in a cerebral cortex.

3. Retina-Cortex Mapping Principle

A visual projection system has a specific afferent pathway and a cortical representation. Spatial topological patterns of visual evoked potentials VEPs are related to positions of a visual stimulus presented in a visual field of a user. An area of an activated region in a visual cortex is positively correlated with strength of visual stimulation. Specifically, light stimulates photoreceptor rod and cone cells in a retina through a left or right cornea. A visual signal is transmitted to a lateral *geniculate* nucleus at a thalamus through an optic nerve and an optic chiasm, and finally to a primary visual cortex. Due to a contralateral nature of the optic chiasm, visual information from a left visual field is transmitted to a right side of an occipital lobe of the primary visual cortex, and visual information from a right visual field is transmitted to a left side of the occipital lobe of the primary visual cortex. When visual fibers perform projection on the cortex of the occipital lobe, a superior visual field is projected to an inferior lip of a calcarine fissure, and an inferior visual field is projected to a superior lip of the calcarine fissure. For example, FIG. 1 shows correspondences between positions of a visual stimulus in a visual field and regions in a primary visual cortex to which corresponding visual signals are transferred.

Figure 1:
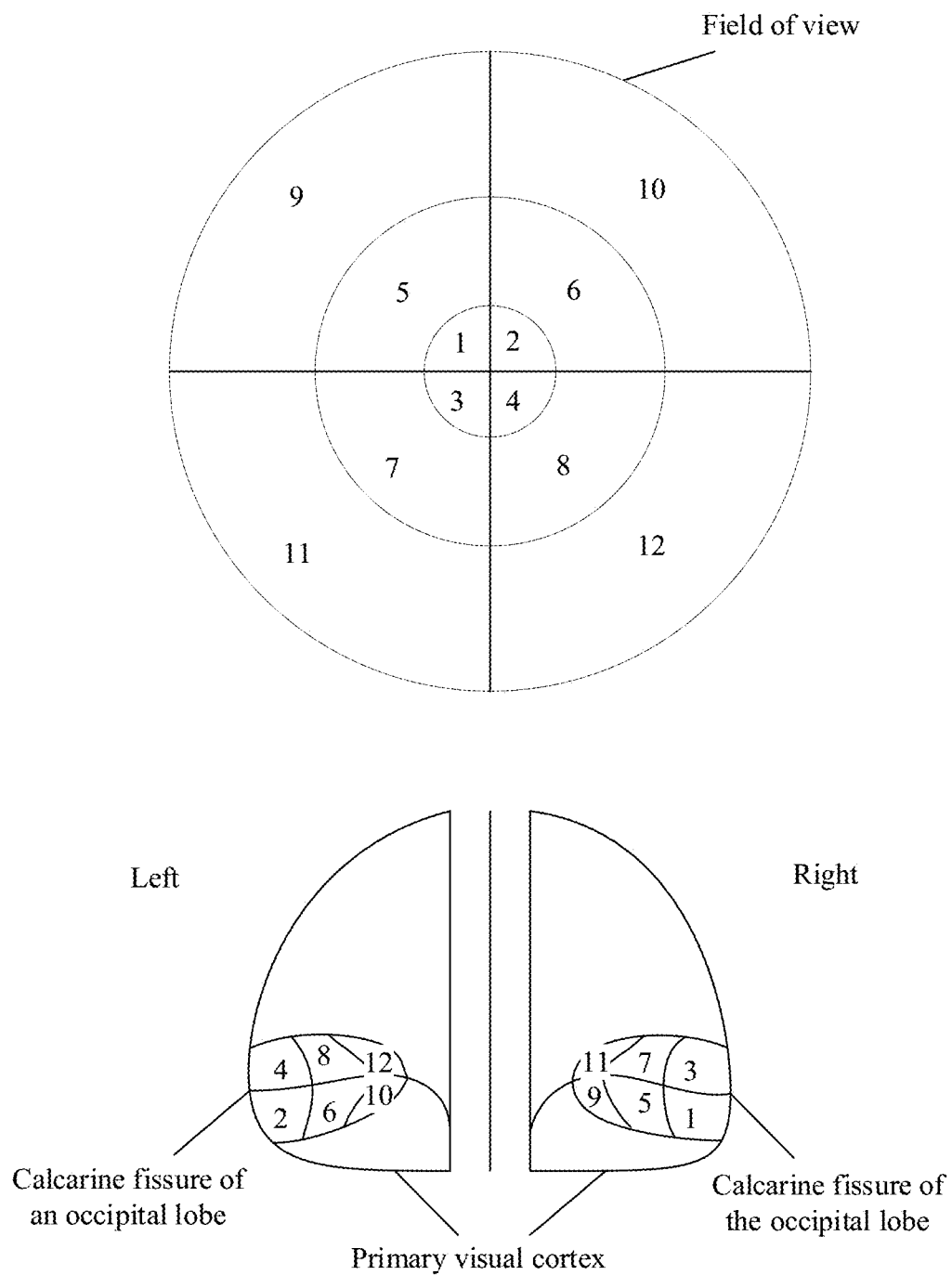
FIG. 1 is a schematic diagram of a retina-cortex mapping principle.

In FIG. 1, a field of view may be considered as a visual field range of a user. The visual field range is divided into 12 regions. The primary visual cortex is located around a calcarine fissure of an occipital lobe, including visual cortices on left and right sides. The primary visual cortex is also divided into 12 regions. Theoretically, when the visual stimulus appears in a region numbered A (the number A is any one of 1 to 12) in the field of view, visual information is projected to a region numbered A in the primary visual cortex.

It should be noted that FIG. 1 is merely an example. During specific implementation, neither the field of view nor the primary visual cortex is limited to being divided into 12 regions. Division shown in FIG. 1 does not constitute a limitation on this application.

A study finds that in time-domain waveforms of VEPs obtained on the occipital lobe using a multi-lead electroencephalograph, it can be observed that spatial distributions of the VEPs are specific, and the specificity results from the visual stimulus being in different positions in the visual field. For example, when a visual blinking stimulus is presented on a single side in the visual field, VEPs with larger amplitudes may be collected at leads located in a primary visual cortex region on an opposite side; and compared with being presented in the inferior visual field, a visual blinking stimulus presented in the superior visual field may evoke reverse potentials. Therefore, based on the retina-cortex mapping principle described above, a relative spatial positional relationship between "a position for visual gazing" and "a calibration stimulus" can be determined by identifying spatial topological patterns of different VEPs, and further, the position for visual gazing can be decoded.

4. Calibration Stimulus

In this application, a calibration stimulus may also be referred to as a visual calibration stimulus, and is a visual stimulus whose position can be clearly known. To be specific, for a visual stimulus appearing in a human-computer interface, a data processing module can perceive and determine a position of the visual stimulus in the interface in real time.

5. Human-Computer Interface (HMI)

A human-computer interface, also referred to as a user interface, is a medium and a dialog interface for transfer and exchange of information between a human and a computer, and is an important part of a computer system. The human-computer interface is a medium for interaction and information exchange between a system and a user, and implements conversion between an internal form of information and a form acceptable to humans.

Figure 2:
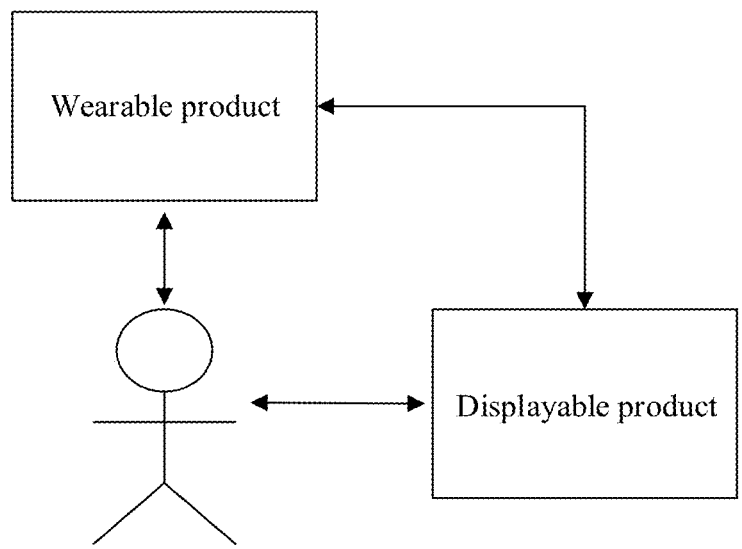
FIG. 2 is a schematic diagram of an application scenario according to this application.

FIG. 2 is a schematic diagram of an application scenario of a human-computer interaction system according to an embodiment of this application. The system includes a wearable product and a displayable product. The wearable product and the displayable product may communicate using a wireless connection, a wired connection, or the like. Further, the wearable product and the displayable product may be alternatively integrated together.

The displayable product is configured to present images to a user. The displayable product may be virtual reality (VR)/augmented reality (AR) glasses, a smart screen, or the like. The wearable product is configured to collect electroencephalography signals of a user. The wearable product may be VR/AR glasses, a headset, or the like. A user can deliver an operational command by watching an image presented by the displayable product, and gazing at an object or a region in a visual field according to operational intent of the user.

Figure 3:
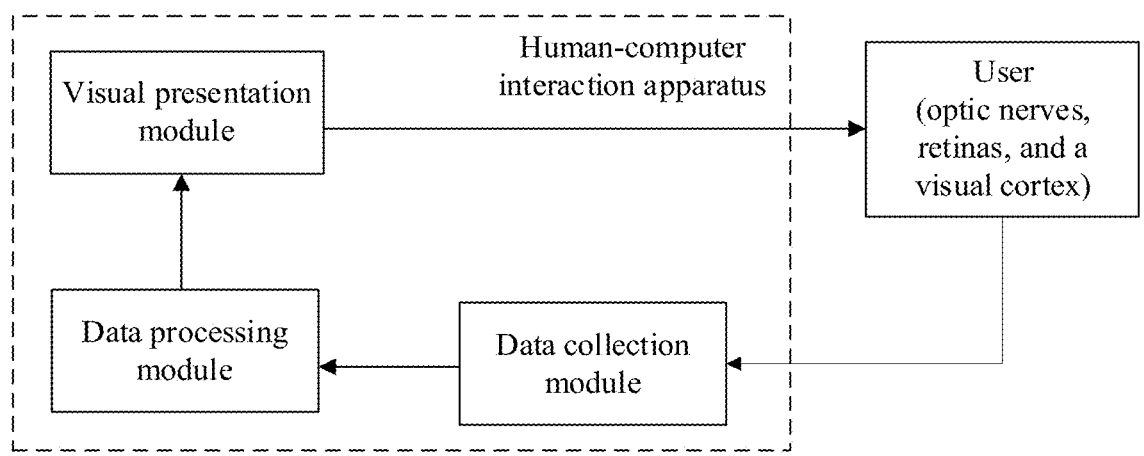
FIG. 3 is a schematic diagram of composition of a human-computer interaction apparatus according to this application.

FIG. 3 is a schematic diagram of a structure of a human-computer interaction apparatus according to an embodiment of this application. The human-computer interaction apparatus includes a visual presentation module, a data collection module, and a data processing module.

The visual presentation module is configured to present an operable human-computer interface to a user, for example, a human-computer interface in a VR/AR scenario, a game interface on a smart screen, or a window interface on a screen. According to a possible novel interaction paradigm designed in this application, a visual calibration stimulus is set for an operable object in an interface, and encoding and decoding are performed using a novel calibration stimulation pattern. In this way, a direction in which a position at which the user gazes is relative to the visual stimulus, or a position for gazing is located, and further, different operational commands are delivered based on different positions at which the user gazes. For example, the visual presentation module may be a screen such as a display system of virtual reality (VR)/augmented reality (AR) glasses, or a smart screen. The visual presentation module may alternatively be any other form of device with a display function, for example, another smart internet of things (IoT) device with a screen (such as a smart air conditioner or a service robot), or a projector.

The data collection module is configured to collect electroencephalography signals of the user using electrodes, perform amplification, filtering, and A/D conversion on the electroencephalography signals to form data information, and send the data information to the data processing module. The data collection module runs on a wearable device, and may be integrated into a wearable device such as glasses or a headset. Alternatively, the data collection module may be deployed in a collector with electroencephalography sensors that is separately worn on a user's head.

The data processing module is configured to analyze data information and detect spatiotemporal distribution characteristics of electroencephalography signals (the spatiotemporal distribution characteristics are obtained based on the ERP (or VEPs) and the retina-cortex mapping principle described above, and are described below, and therefore, details are not described herein). Electroencephalography signals with different spatiotemporal distribution characteristics can be evoked by gazing at different positions or regions around a visual stimulus region. Therefore, a relative spatial positional relationship between an object that the user intends to operate and a current point for gazing can be determined based on spatiotemporal distribution characteristics of electroencephalography signals, and an instruction currently delivered by the user can be determined. For example, the user can deliver an operational command by watching an interface presented by the visual presentation module, and relative to an operable object (assuming that a display region of the operable object overlaps a visual stimulus region) in a visual field, gazing at a region or direction in space around the operable object according to operational intent of the user. For example, the data processing module may be integrated into a same device (for example, VR/AR glasses) with the data collection module, the visual presentation module, or the like; or the data processing module may be deployed in an independent device of the user with the visual presentation module, such as a mobile phone, a computer, or a tablet; or the data processing module may be deployed in a cloud server, and communicate with the data collection module and the visual presentation module using a wireless network.

The visual presentation module is further configured to feed an execution result of the operational command back to the user based on an instruction sent by the data processing module, for example, succeeded in changing a spatial position of an object or a position of a character as intended in a VR/AR scenario, or succeeded in resizing a window on a screen; or a video progress bar on a screen dragged to a target position.

The following describes an electroencephalography signal decoding principle and algorithm used by the data processing module. Specifically, it can be learned based on the foregoing descriptions of the related concepts that under a condition of directions of gaze being different, VEP signals obtained using a multi-lead electroencephalograph have different characteristic patterns in a plurality of dimensions such as time and space. For a purpose of distinguishing between characteristic patterns of electroencephalography signals that fall into different classes, a denoising algorithm such as task-related component analysis needs to be used first in electroencephalography signal decoding, to suppress extraction of characteristics of task-unrelated background electroencephalography signal noise, and increase signal-to-noise ratios of task-related characteristic signals. Then, according to a criterion of maximizing differences in time-space/space-frequency characteristics of electroencephalography signals that fall into different classes, classes of electroencephalography signals can be recognized in corresponding discriminant spaces using pattern recognition algorithms such as linear discriminant analysis and common spatial pattern analysis. After characteristic patterns of various classes of electroencephalography signals generated under the condition of directions of gaze being different are recognized, a relative spatial positional relationship between "a position for visual gazing" and "a calibration stimulus" can be determined, and further, the position for visual gazing can be decoded based on real-time positional information of "the calibration stimulus". The following provides principles of algorithms such as task-related component analysis, linear discriminant analysis, and common spatial pattern analysis.

Task-Related Component Analysis

A task-related component analysis (TRCA) algorithm helps reduce interference from task-unrelated background electroencephalography signals by maximizing correlation between task-related component signals of events, efficiently decoding a task-related characteristic. When a model is built, it is considered that collected multi-channel electroencephalography signals are obtained by linearly combining task-related signals s (t) and event-unrelated signals n (t), as shown in an equation (1):

$$x_j(t) = a_{1,j}s(t) + a_{2,j}n(t); j=1,2,\ldots,N_c \quad (1)$$

In the equation (1), j is a lead number, $a_{1j}$ and $a_{2,j}$ are corresponding weight values, and $N_c$ is a quantity of leads. s(t) is reproduced using a group of x(t), which may be expressed as an equation (2):

$$y(t) = \sum_{j=1}^{N_c} w_j x_j(t) = \sum_{j=1}^{N_c} (w_j a_{1,j}s(t) + w_j a_{2,j}n(t)) \quad (2)$$

To reproduce s(t) to a maximum extent, that is, to implement y(t)=s(t), a covariance between events may be maximized. A sum of covariances between all possible events may be expressed as an equation (3):

$$\Sigma_{h_1,h_2=1}^{N_t} \Sigma_{t_1,t_2=1}^{N_c} w_{j_1} w_{j_2} Cov(x_i^{h_1}(t), x_i^{h_2}(t)) = w^T S w \quad (3)$$

In the equation (3), $N_t$ is a quantity of events, $h_1$ and $h_2$ respectively represent an $h_1$th event and an $h_2$th event, w is a projection matrix, and $w^T$ is a transposed matrix of w. $s=(s_{j_1 j_2})_{1 \leq j_1, j_2 \leq N_c}$, which is defined in an equation (4):

$$S_{j_1 j_2} = \sum_{\substack{h_1,h_2=1 \\ h_1 \neq h_2}}^{N_t} Cov(x_{j_1}^{h_1}(t), x_{j_2}^{h_2}(t)) \quad (4)$$

To obtain a definite solution, a variance of y (t) is limited to 1, that is, as shown in an equation (5):

$$Var(y(t)) = \sum_{j_1,j_2=1}^{N_c} w_{j_1} w_{j_2} Cov(x_{j_1}(t), x_{j_2}(t)) = w^T Q w = 1 \quad (5)$$

The constrained optimization problem may be solved using a method shown in an equation (6):

$$\hat{w} = \arg\max_w J(w) = \arg\max_w \frac{w^T S w}{w^T Q w} \quad (6)$$

After various projection matrices are obtained, an original signal is projected using the projection matrices, and then a task-related signal is extracted from the original signal. In this way, denoising is completed.

Linear Discriminant Analysis

Linear discriminant analysis (LDA) is a supervised learning algorithm commonly used in ERP characteristic decoding, with features such as a small amount of computation and a good classification effect. LDA projects high-dimensional sample data into a low-dimensional space, to ensure that the sample data has a maximal inter-class distance and a minimal intra-class distance in the space. An objective function of LDA may be expressed as an equation (7):

$$\hat{w} = \arg\max_w J(w) = \frac{w^T S_b w}{w^T S_w w} \quad (7)$$

In the equation (7), $s_b$ is an inter-class divergence matrix, and $s_w$ is an intra-class divergence matrix. A projection matrix W is obtained by solving for d largest eigenvalues and corresponding d eigenvectors ($w_1, w_2, w_3, \ldots, W_d$) of $S_w^{-1} S_b$. The projection matrix is different from the projection matrices obtained using the task-related component analysis algorithm. After the projection matrix W is obtained, the denoised signal may be projected using the projection matrix, to obtain a low-dimensional spatial signal with a minimal intra-class variance and a maximal inter-class variance.

Common Spatial Pattern

Common spatial pattern (CSP) is a common algorithm for decoding spatial distribution characteristics of frequency-domain energy of electroencephalography signals. CSP looks for an appropriate projection matrix w (the projection matrix is different from the projection matrices obtained using the task-related component analysis and linear discriminant analysis algorithms), so that a variance of one class of projected signals is maximized while a variance of another class is minimized. An objective function of CSP may be expressed as an equation (8), where $c_i$ is a spatial covariance matrix of an ith class.

$$\hat{w} = \arg\max_w J(w) = \arg\max_w \frac{w^T C_1 w}{w^T C_2 w} \quad (8)$$

During solving, a constraint $w^T C_2 w=1$ is added, and a Lagrange multiplier method is used. In this case, the constrained optimization problem is transformed into a problem of solving for extreme values shown in an equation (9).

$$L(\lambda, w) = w^T C_1 w - \lambda(w^T C_2 w - 1) \quad (9)$$

$$\frac{\partial L}{\partial w} = w^T C_1 - \lambda w^T C_2 = 0 \quad (10)$$

$$\Leftrightarrow C_2^{-1} C_1 w = \lambda w \quad (11)$$

An extreme value solving process of the equation (9) is shown in the equations (10) and (11). A spatial filter w includes eigenvectors corresponding to d largest eigenvalues and d smallest eigenvalues of a matrix $C_2^{-1} C_1$. After a projection matrix is obtained through calculation using the equation (8) to the equation (11), the signal obtained after linear discriminant analysis is performed is projected using the projection matrix, and then a spatial characteristic distribution of a signal obtained through projection is matched with trained characteristic distributions. In this way, a corresponding characteristic type is determined, and the signal is classified.

In a possible implementation, in addition to the algorithms such as TRCA, LDA, and CSP described above, the data processing module may process electroencephalography signals with reference to algorithms such as support vector machines (SVM), canonical correlation analysis (CCA), and discriminative canonical pattern matching (DCPM).

Specifically, this application provides a novel human-computer interaction paradigm. The visual presentation module can present a plurality of operable objects to the user, and display a visual calibration stimulus. According to operational intent, the user gazes at regions around the visual calibration stimulus in an interface displayed by the visual presentation module. The data collection module pre-processes electroencephalography signals of the user. The data processing module analyzes spatiotemporal distribution characteristics of the electroencephalography signals, can determine, based on the spatiotemporal distribution characteristics of the electroencephalography signals, a relative spatial positional relationship between an object that the user intends to operate and a current point for gazing, and further, can determine an instruction currently delivered by the user. None of hardware forms of the modules, manners in which the modules are deployed and communicate, or the like in an actual application process affects technical essence of this application.

Figure 4:
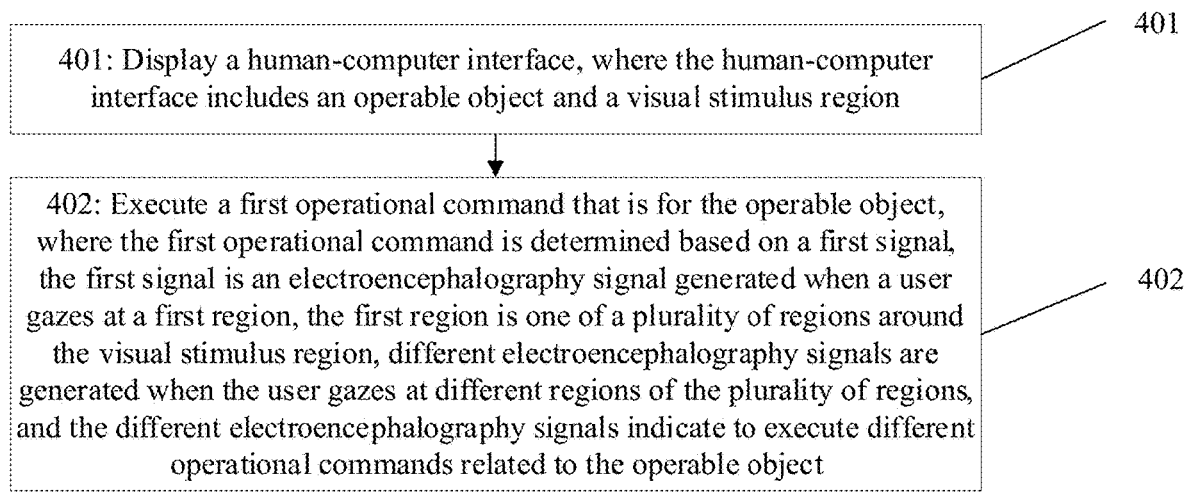
FIG. 4 is a schematic flowchart of a human-computer interaction method according to this application.

Based on the foregoing description, this application provides a human-computer interaction method. For example, the method may be performed by the visual presentation module, VR/AR glasses, or the like described above. FIG. 4 is a schematic flowchart of a human-computer interaction method according to an embodiment of this application. The method may include but is not limited to step 401 and step 402, which are specifically as follows.

401: Display a human-computer interface, where the human-computer interface includes an operable object and a visual stimulus region.

Specifically, there may be one or more operable objects in the human-computer interface, and a related operation may be performed on the operable object based on an operational command. There may also be one or more visual stimulus regions in the human-computer interface. The visual stimulus region is configured to stimulate vision of a user, so that the user generates electroencephalography signals.

The visual stimulus region includes a visual stimulus constituent element. The visual stimulus constituent element may present a visual stimulus in various visual stimulation patterns. The visual stimulation patterns may include a blinking stimulation pattern, a motion stimulation pattern, an element jump stimulation pattern, and a hybrid stimulation pattern. The blinking stimulation pattern is a stimulation pattern in which a visual stimulus constituent element in the visual stimulus region sometimes appears and sometimes disappears. The motion stimulation pattern is a stimulation pattern in which a visual stimulus constituent element in the visual stimulus region moves in a preset direction and on a preset trajectory. The element jump stimulation pattern is a stimulation pattern in which at least one of a shape, a color, and shading of a visual stimulus constituent element in the visual stimulus region continuously changes. The hybrid stimulation pattern is a stimulation pattern in which at least two patterns of the blinking stimulation pattern, the motion stimulation pattern, and the element jump stimulation pattern are combined. The visual stimulus constituent element in the blinking stimulation pattern, the motion stimulation pattern, and the element jump stimulation pattern may be presented in a transient manner.

Specifically, the visual stimulus constituent element may be in a shape of any geometric graphic, for example, a rectangle, scattered dots, a horizontal line, or a solid figure. Optionally, the color of the visual stimulus constituent element is one of three primary colors in optics, or a color obtained by superimposing at least two of the three primary colors in optics in any proportion.

In this application, because a position of the visual stimulus region can be perceived and determined by a data processing module, visual stimulation generated in the visual stimulus region is also referred to as calibration stimulation.

Figure 5A:
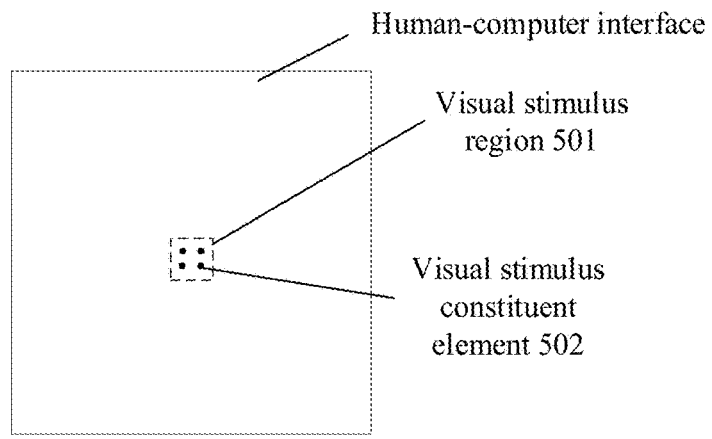
FIG. 5A is a schematic diagram of a visual stimulus region and a visual stimulus constituent element according to this application.

For ease of understanding relationships between the visual stimulus region, the visual stimulus constituent element, the visual stimulation pattern, and visual stimulation, refer to, for example, FIG. 5A. FIG. 5A shows an example of a visual stimulus region 501 included in a human-computer interface. The visual stimulus region 501 is a region in which a visual stimulus is presented and that is in the human-computer interface. The visual stimulus region 501 includes a visual stimulus constituent element 502. The visual stimulus constituent element 502 is shown using scattered dots as an example. However, in a specific implementation process, the visual stimulus constituent element 502 is not limited to scattered dots, and may change. The visual stimulation pattern is a pattern in which the visual stimulus constituent element 502 changes. The changing may be, for example, blinking, moving in various directions, or a shape, a color, or shading of the visual stimulus constituent element 502 changing. Visual stimulation is stimulation caused to vision of a user when the visual stimulus constituent element 502 is presented in the visual stimulus region 501 in one or more visual stimulation patterns.

402: Execute a first operational command on the operable object, where the first operational command is determined based on a first signal, the first signal is an electroencephalography signal generated when the user gazes at a first region, the first region is one of a plurality of regions around the visual stimulus region, different electroencephalography signals are generated when the user gazes at different regions of the plurality of regions, and the different electroencephalography signals indicate to execute different operational commands related to the operable object.

In this embodiment of this application, a novel human-computer interaction paradigm is designed. In the novel interaction paradigm, the visual stimulus region and the operable object are provided in the human-computer interface. The user may gaze at different regions of the plurality of regions around the visual stimulus region. It can be learned based on the foregoing description of the retina-cortex mapping principle that electroencephalography signals with different spatiotemporal distribution characteristics can be generated when the user gazes at different regions of the plurality of regions. In addition, it can be learned based on the electroencephalography signal decoding principle and algorithm described above that the data processing module can identify electroencephalography signals with different spatiotemporal distribution characteristics. The electroencephalography signals with different spatiotemporal distribution characteristics correspond to different operational commands. Therefore, after identifying a specific electroencephalography signal characteristic, the data processing module may find a specific operational command through matching, and then transfer the specific operational command to the visual presentation module. The visual presentation module executes the operational command and displays an execution result of the command in the visual presentation module. To be specific, in the novel interaction paradigm, an intended operation of the user can be decoded based on that the user gazes at different regions around the visual stimulus, the intended operation can be quickly responded to and completed, and the execution result can be presented in the visual presentation module and fed back to the user.

Figure 5B:
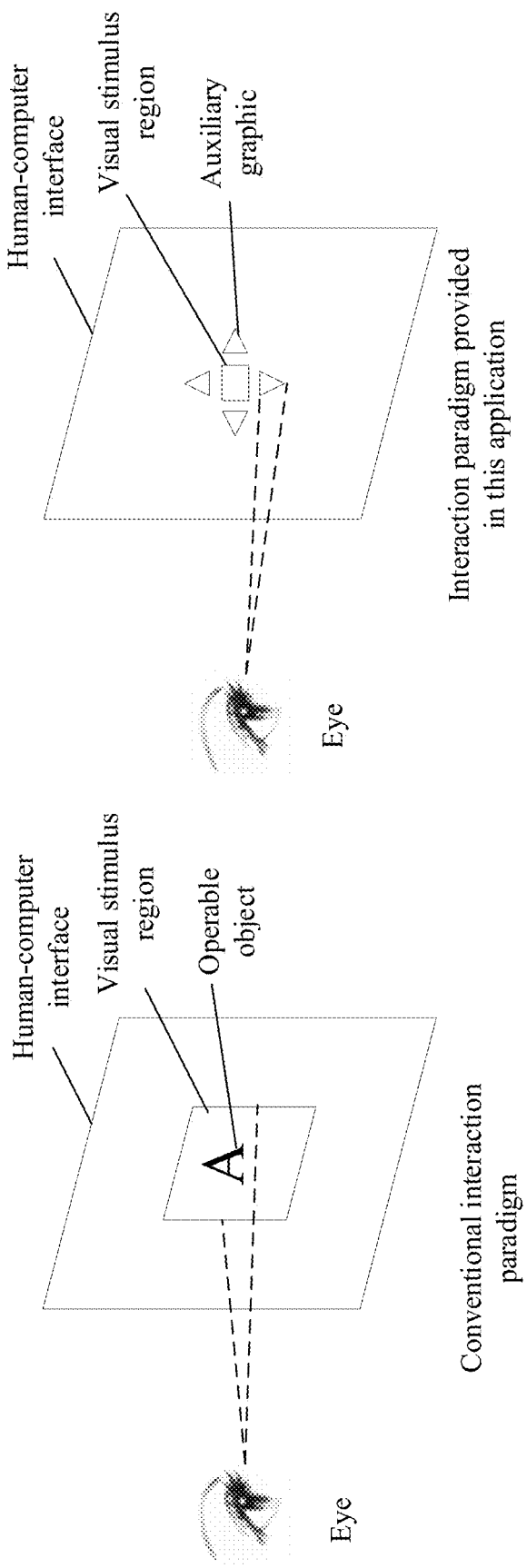
FIG. 5B is a schematic diagram of a conventional human-computer interaction paradigm and an interaction paradigm provided in this application.

For ease of understanding the novel interaction paradigm described above, refer to, for example, FIG. 5B. FIG. 5B shows examples of a conventional interaction paradigm and the interaction paradigm provided in this application. In the conventional interaction paradigm, a visual stimulus region is superimposed on a display region of an operable object. When a user intends to operate the operable object, the user needs to gaze at the visual stimulus region that is superimposed on the operable object, to excite an electroencephalography signal. In addition, one visual stimulus can only correspond to delivery of one operational command.

In the interaction paradigm provided in this application in FIG. 5B, a visual stimulus region may be superimposed on a display region of an operable object, or a visual stimulus may be provided in a region around an operable object. Alternatively, when there are a plurality of operable objects and a plurality of visual stimulus regions in a human-computer interface, the plurality of visual stimulus regions may be provided in regions around the plurality of operable objects.

When the user intends to operate the operable object, the user does not need to gaze directly at the visual stimulus region, but rather gaze at a region around the visual stimulus region according to operational intent. FIG. 5B further shows an example in which there are a plurality of auxiliary graphics around the visual stimulus region. The plurality of auxiliary graphics are mainly configured to indicate a position for gazing to the user. For example, FIG. 5B shows an example in which there are four auxiliary graphics. Assuming that the visual stimulus region is superimposed on the display region of the operable object, the four auxiliary graphics are separately provided in four directions, up, down, left, and right, of the operable object, and the four auxiliary graphics may indicate four different directions of motion of the operable object. If the user wants the operable object to move in a direction, the user may gaze at the auxiliary graphic in the direction around the operable object. It can be learned based on the retina-cortex mapping principle that an electroencephalography signal with a corresponding spatiotemporal distribution characteristic can be generated when the user gazes at the auxiliary graphic in the direction. The data processing module can identify the spatiotemporal distribution characteristic of the electroencephalography signal, and further, find a corresponding operational command through matching.

It should be noted that a quantity and a shape of the auxiliary graphics shown in FIG. 5B are merely an example. A quantity of the auxiliary graphics around the visual stimulus region may be any integer greater than 1. The auxiliary graphics may be in a shape of any geometric graphic or the like. The quantity and shape of the auxiliary graphics are not limited in this application.

Specifically, when the user gazes at different regions of the plurality of regions, different electroencephalography signals are generated. The different electroencephalography signals are evoked in different regions in a primary visual cortex when the user gazes at the different regions. Specifically, the different electroencephalography signals are signals with different spatiotemporal distribution characteristics collected based on the retina-cortex mapping principle. That the spatiotemporal distribution characteristics are different means that peaks in characteristic waveforms of the evoked electroencephalography signals occur at different moments, and that the evoked electroencephalography signals appear in different regions in the primary visual cortex. The first region is determined based on a region in which the electroencephalography signal appears in the primary visual cortex. In a specific implementation process, a spatiotemporal distribution characteristic of an electroencephalography signal may indicate a direction in which a region at which the user gazes is relative to the visual stimulus region. Therefore, the first region is determined based on a spatiotemporal distribution characteristic of the first signal. For ease of understanding, refer to, for example, FIG. 5C and FIG. 5D.

Figure 5C:
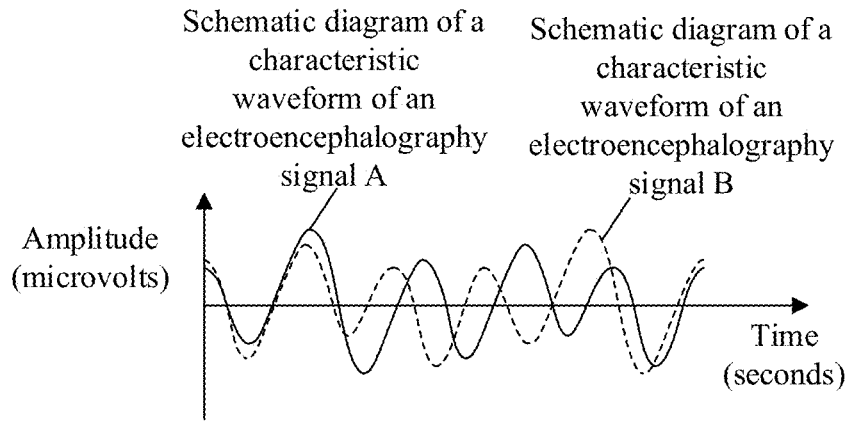
FIG. 5C is a schematic diagram of characteristic waveforms of electroencephalography signals according to this application.
Figure 5D:
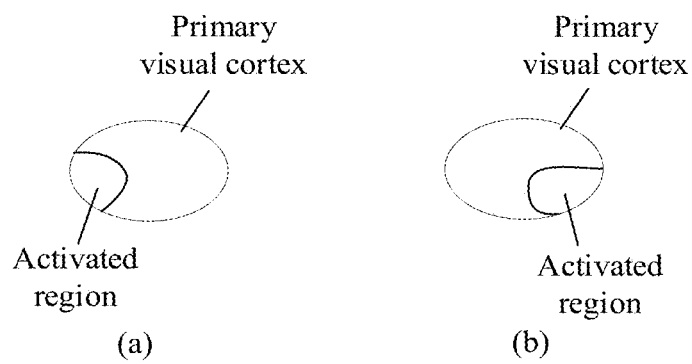
FIG. 5D is a schematic diagram of regions activated by a visual stimulus in a primary visual cortex according to this application.

FIG. 5C is a schematic diagram of characteristic waveforms of two different electroencephalography signals (an electroencephalography signal A and an electroencephalography signal B). It is assumed that the electroencephalography signal A is an electroencephalography signal generated when a user gazes at a left region of a visual stimulus region, and the electroencephalography signal B is an electroencephalography signal generated when the user gazes at a right region of the visual stimulus region. When the user gazes at the left region of the visual stimulus region, the visual stimulus region is in a right region in a field of view of the user. It can be learned based on the retina-cortex mapping principle described above that visual information is transmitted to a left side of an occipital lobe of a primary visual cortex. To be specific, the left side of the occipital lobe of the primary visual cortex is activated, evoking an electroencephalography signal of high strength (the electroencephalography signal is collected by a collector, and the electroencephalography signal A is obtained). For the activated region, refer to, for example, (a) in FIG. 5D. When the user gazes at the right region of the visual stimulus region, the visual stimulus region is in a left region in the field of view of the user. It can be learned based on the retina-cortex mapping principle described above that visual information is transmitted to a right side of the occipital lobe of the primary visual cortex. To be specific, the right side of the occipital lobe of the primary visual cortex is activated, evoking an electroencephalography signal of high strength (the electroencephalography signal is collected by the collector, and the electroencephalography signal B is obtained). For the activated region, refer to, for example, (b) in FIG. 5D. It can be learned from FIG. 5D that the two electroencephalography signals have different spatial distribution characteristics. In addition, it can be learned from FIG. 5C that peaks (valleys) in the characteristic waveforms of the electroencephalography signal A and the electroencephalography signal B occur at different moments. Therefore, it can be learned that the two electroencephalography signals have different temporal distribution characteristics. It should be noted that the left side and the right side are both determined based on a left side and a right side of the user. Information shown in FIG. 5C and FIG. 5D is merely an example and does not constitute a limitation on this application.

Figure 5E:
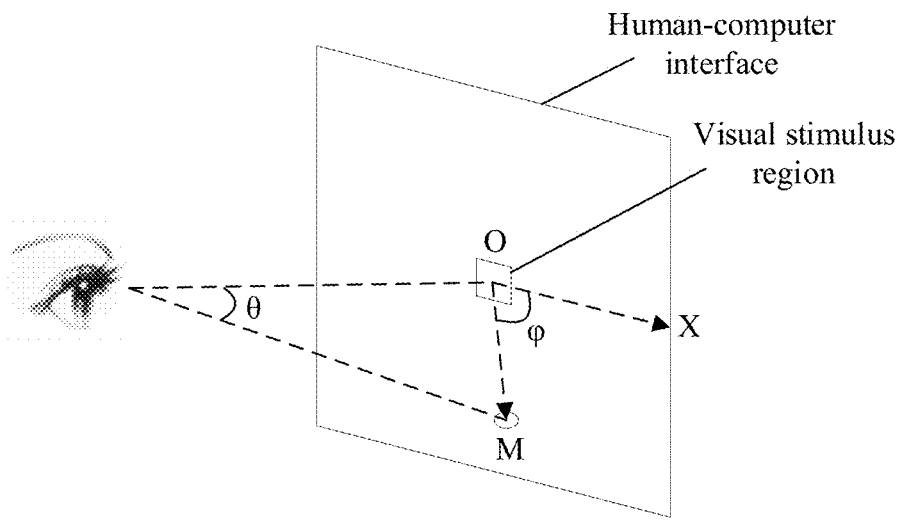
FIG. 5E is a schematic diagram of a region or position around a visual stimulus region according to this application.

For ease of understanding a region or position around the visual stimulus region, refer to, for example, FIG. 5E. In FIG. 5E, a polar coordinate system is built with a center point O of a visual stimulus region as an origin. OX is a polar axis of the polar coordinate system. M is a center point of a region for gazing. An included angle between OM and OX is Q. An included angle between a line of sight obtained when a user gazes at the origin O and a line of sight obtained when the user gazes at M is θ. In this application, φ may be any angle between 0 degrees and 360 degrees, and θ is any angle between 0 degrees and 180 degrees. However, θ is not of 0 degrees. To be specific, the region for gazing does not overlap the visual stimulus region. In other words, regions or positions meeting that φ∈[0°, 360°] and θ∈(0°, 180°] are all regions or positions around the visual stimulus region.

Optionally, an included angle between a line of sight obtained when the user gazes at the first region and a line of sight obtained when the user gazes at a center point of the visual stimulus region is in a preset range. To be specific, a value of the included angle θ is in the preset range. For example, the included angle θ is not greater than 5°. This can ensure that visual stimulation caused by the visual stimulus region to the user is strong enough to evoke an electroencephalography signal of high strength.

In conclusion, based on that spatiotemporal distribution characteristics of electroencephalography signals are different or based on specificity of spatiotemporal distribution characteristics of electroencephalography signals, electroencephalography signals that fall into different classes can be identified, to identify a region at which a user gazes, or to identify a direction in which a position at which a user gazes is relative to a visual stimulus region, and further, an intended operational instruction of the user can be found through matching.

Figure 6:
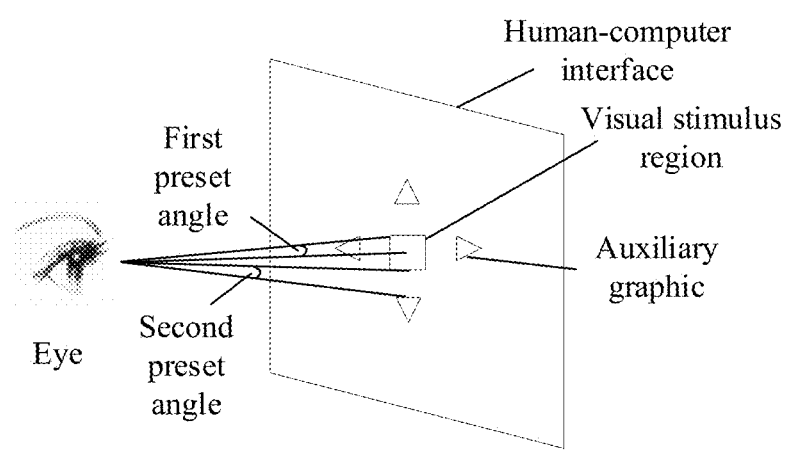
FIG. 6 is a schematic diagram of a specific human-computer interaction paradigm and a human-computer interface according to this application.

In a possible implementation, a size of the visual stimulus region and a distance between an auxiliary graphic and the visual stimulus region may be designed. Specifically, an included angle between the line of sight obtained when the user gazes directly at the center point of the visual stimulus region and a line of sight obtained when the user gazes directly at a point that is in the visual stimulus region and that is farthest away from the center point is a viewing angle not greater than a first preset angle. The first preset angle may be, for example, a 0.5° viewing angle or a 0.6° viewing angle. The first preset angle may be set based on an actual requirement. In addition, a distance between the visual stimulus region and any auxiliary graphic may be represented by a line segment in the human-computer interface. In this case, an included angle between a line of sight obtained when the user gazes directly at one endpoint of the line segment and a line of sight obtained when the user gazes directly at the other endpoint of the line segment may be designed as a viewing angle not greater than a second preset angle. The second preset angle may be, for example, a 2° viewing angle or a 3° viewing angle. The second preset angle may be set based on an actual requirement. For ease of understanding, refer to, for example, lines of sight and included angles shown in FIG. 6.

The auxiliary graphics are configured to indicate a position for gazing to the user and help the user deliver an operational command. Whether the auxiliary graphics are present or not does not affect the user delivering different commands by gazing at different regions. Therefore, in a possible implementation, none or some of the auxiliary graphics may be displayed around the visual stimulus region in the human-computer interface.

Figure 7:
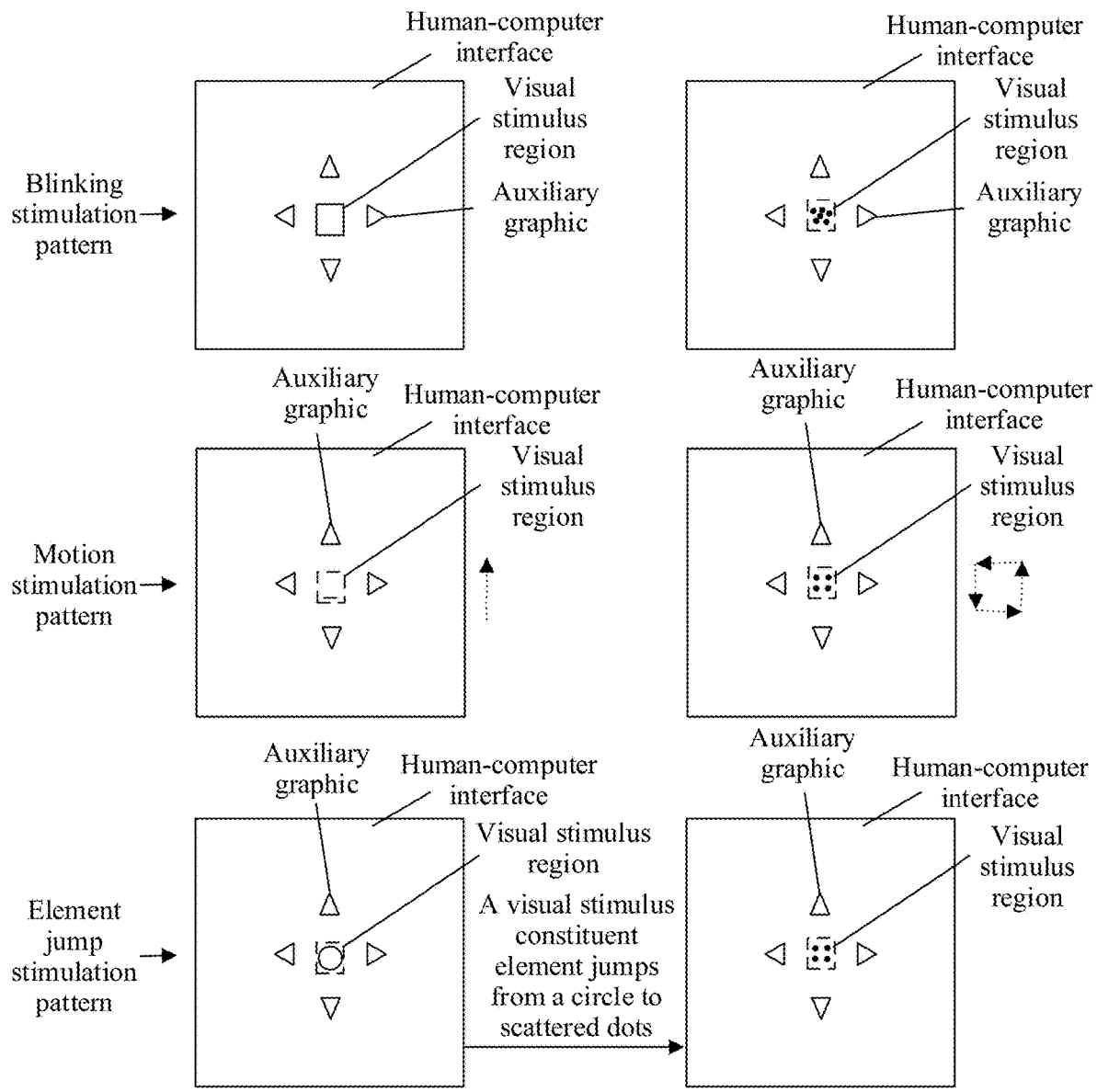
FIG. 7 is a schematic diagram of visual stimulation patterns according to this application.

In a possible implementation, the visual stimulation pattern in the visual stimulus region displayed in the human-computer interface in this application may be designed. It can be learned based on the foregoing description that the visual stimulation pattern may include the blinking stimulation pattern, the motion stimulation pattern, the element jump stimulation pattern, and the hybrid stimulation pattern. For example, refer to FIG. 7. In FIG. 7, for example, a visual stimulus constituent element is a rectangle, a circle, scattered dots, or a horizontal line. In a blinking stimulation pattern, a rectangle or scattered dots in a visual stimulus region may sometimes appear and sometimes disappear. In a motion stimulation pattern, a horizontal line in a visual stimulus region may move upward, or scattered dots in a visual stimulus region may move counterclockwise in cycles, or the like. In an element jump stimulation pattern, a visual stimulus constituent element in a visual stimulus region jumps from a circle to scattered dots. The rectangle, scattered dots, and horizontal line shown in FIG. 7 may also be the visual stimulus constituent element in the element jump stimulation pattern. For example, the visual stimulus constituent element in the element jump pattern may switch or jump between the rectangle, scattered dots, and horizontal line arbitrarily. Optionally, in a switching or jumping process, a color of the element may also change, and the like. In FIG. 7, the stimulation patterns are all shown using an example in which there are auxiliary graphics. In a specific implementation process, the auxiliary graphics may be omitted.

For example, in FIG. 7, the visual stimulus constituent element in the visual stimulus region in the blinking stimulation pattern may be present and absent alternately in cycles of 0.5 seconds, that is, present for 0.5 seconds and then absent for 0.5 seconds, or the like. For example, the visual stimulus constituent element in the visual stimulus region in the motion stimulation pattern moves clockwise, counterclockwise, or up and down for 0.5 seconds and then remains stationary for 0.8 seconds, or the like. For example, in the element jump stimulation pattern, there may be switchovers between a plurality of visual stimulus constituent elements, with an element displayed for 0.3 seconds after each switchover, or the like.

Figure 8:
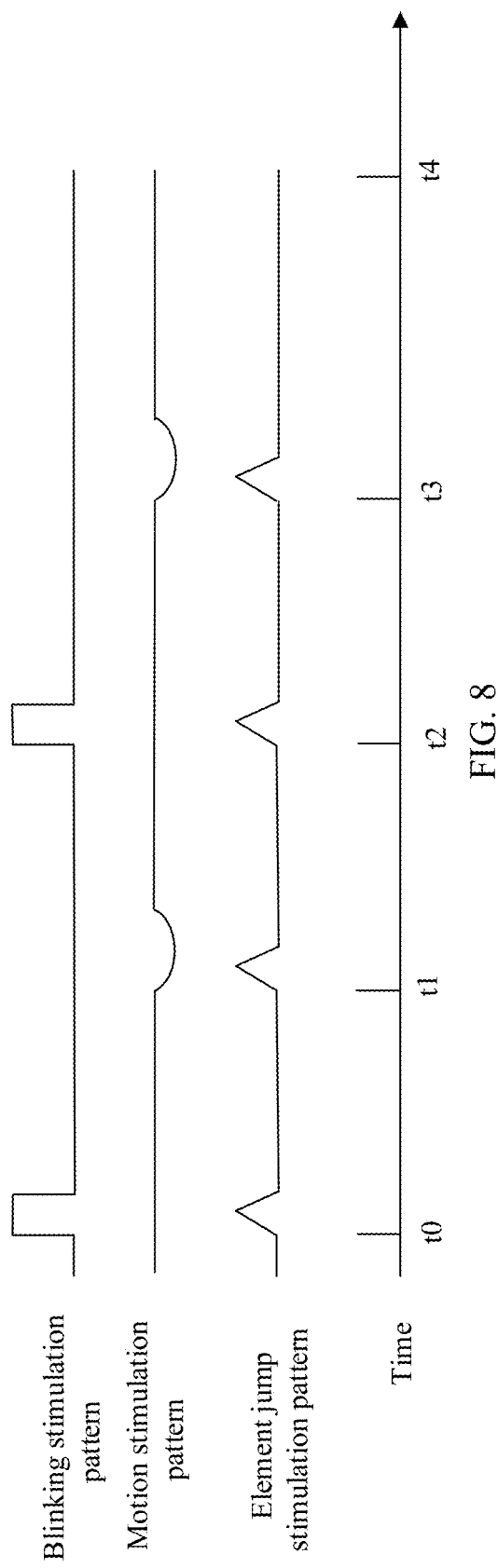
FIG. 8 and FIG. 9 are schematic diagrams of timings in visual stimulation patterns according to this application.

For ease of understanding stimulation timings in the visual stimulation patterns, refer to, for example, FIG. 8. FIG. 8 is a schematic diagram of examples of stimulation timings in a blinking stimulation pattern, a motion stimulation pattern, and an element jump pattern. In FIG. 8, a visual stimulus constituent element in the blinking stimulation pattern appears at both a moment t0 and a moment t2, exists for a specific amount of time, and may not appear at other times. A visual stimulus constituent element in the motion stimulation pattern starts to move at both a moment t1 and a moment t3, moves for a specific amount of time, and may not move at other times, that is, may remain stationary. In the element jump pattern, a visual stimulus constituent element appears at each of moments t0 to t3, two adjacent visual stimulus constituent elements may be different (for example, different in at least one of shape, color, and shading), each constituent element disappears after existing for a specific amount of time, and then another constituent element appears. Optionally, element switching in the element jump pattern may be instantaneous, that is, there is no waiting time between displays of two elements. Information shown in FIG. 8 is merely an example and does not constitute a limitation on this application.

In a possible implementation, the hybrid stimulation pattern may include a stimulation pattern in which at least two patterns of the blinking stimulation pattern, the motion stimulation pattern, and the element jump stimulation pattern are presented alternately. For ease of understanding, refer to, for example, FIG. 9.

Figure 9:
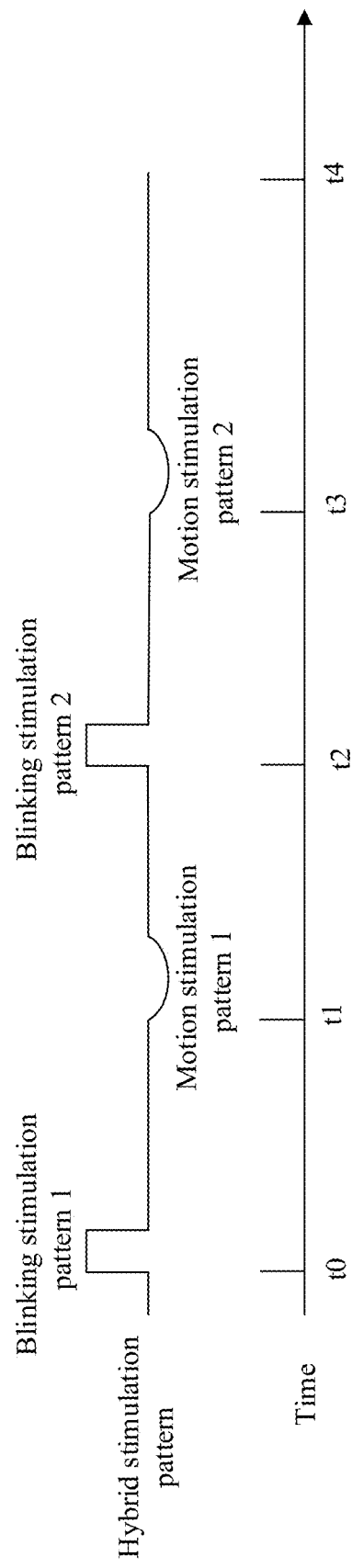

FIG. 9 is a schematic diagram of an example of stimulation timings in a hybrid stimulation pattern in which a blinking stimulation pattern and a motion stimulation pattern are combined. It can be learned from FIG. 9 that stimuli in the blinking stimulation pattern and stimuli in the motion stimulation pattern may appear alternately. Optionally, a blinking stimulation pattern 1 and a blinking stimulation pattern 2 in FIG. 9 may be a same stimulation pattern or different stimulation patterns. For different blinking stimulation patterns, it may be that visual stimulus constituent elements are different in one or more of shape, color, shading, blinking frequency, or duration of presence. Likewise, optionally, a motion stimulation pattern 1 and a motion stimulation pattern 2 in FIG. 9 may be a same stimulation pattern or different stimulation patterns. For different motion stimulation patterns, it may be that visual stimulus constituent elements are different in one or more of shape, color, shading, manner of movement, speed of movement, or duration of movement. The manners of movement may include moving clockwise, moving counterclockwise, moving up and down, moving arbitrarily in any direction, or the like.

Besides, in addition to the hybrid stimulation pattern that is obtained when the blinking stimulation pattern and the motion stimulation pattern are combined, for stimulation timings in another hybrid stimulation pattern that is obtained when two or three patterns of the blinking stimulation pattern, the motion stimulation pattern, and the element jump stimulation pattern are combined, refer to, for example, FIG. 9. Details are not described again. For different element jump stimulation patterns, it may be that visual stimulus constituent elements are different in one or more of shape, color, shading, frequency of jumps, or duration of presence.

In a possible implementation, the hybrid stimulation pattern includes a first stimulation pattern, the first stimulation pattern is one of the blinking stimulation pattern, the motion stimulation pattern, and the element jump stimulation pattern, and the first stimulation pattern is displayed at least twice, where visual stimuli presented when the first stimulation pattern is displayed for the first time and the second time are different. For ease of understanding, refer to, for example, FIG. 10 and Table 1, or FIG. 11 and Table 2.

Figure 10:
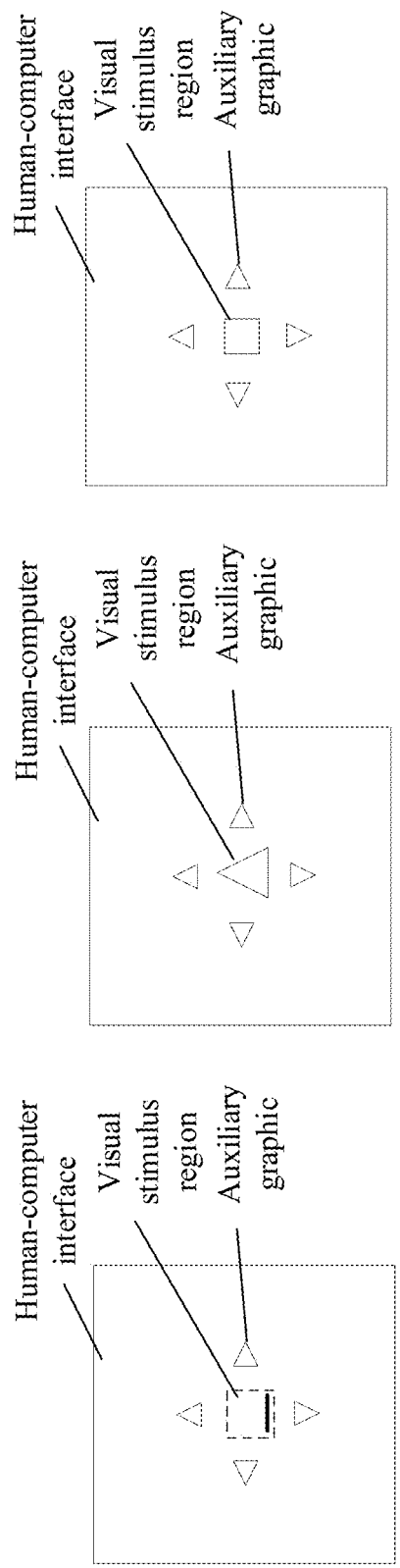

FIG. 10 shows shapes of visual stimulus constituent elements in a hybrid stimulation pattern. A horizontal line, a triangle, and a square are used as examples. The horizontal line implements stimulation in a motion stimulation pattern. The triangle and the square implement stimulation in a blinking pattern. The triangle and the square may be in a same color, for example, red. Alternatively, the triangle and the square may be in different colors, for example, the triangle in blue and the square in green. In addition, a color of the horizontal line may also be designed. The horizontal line may be in any color. Table 1 shows an example of stimulation timings in the hybrid stimulation pattern shown in FIG. 10.

TABLE 1

| Sub-time window | t0 | | t1 | | t2 | | t3 | |
| Duration | 0.5 seconds | | 0.5 seconds | | 0.5 seconds | | 0.5 seconds | |
| --- | --- | --- | --- | --- | --- | --- | --- | --- |
| Blinking stimulation pattern | The triangle present for 0.2 seconds | The triangle absent for 0.3 seconds | | | The square present for 0.2 seconds | The square absent for 0.3 seconds | | |
| Motion stimulation pattern | | | The horizontal line moving upward for 0.2 seconds | The horizontal line absent for 0.3 seconds | | | The horizontal line moving downward for 0.2 seconds | The horizontal line absent for 0.3 seconds |

It can be learned from Table 1 that in the hybrid stimulation pattern, it is assumed that total stimulation duration is 2 seconds, and the 2-second time window is divided into four 0.5-second sub-time windows. In a first sub-time window (t0) and a third sub-time window (t2), the blinking stimulation pattern works. The triangle and the square are used to stimulate vision, and disappear after being present for 0.2 seconds. In a second sub-time window (t1) and a fourth sub-time window (t3), the motion stimulation pattern works, and methods of the horizontal line moving upward and moving downward are separately used to stimulate vision. The color of the horizontal line may be the same as a color of an object displayed in a previous sub-time window. The horizontal line disappears after moving for 0.2 seconds.

It should be noted that in Table 1, the total stimulation duration is not limited to 2 seconds, and the duration of each sub-time window is not limited to 0.5 seconds either, and may be another value, for example, 0.6 seconds or 0.4 seconds. In addition, the objects stimulating vision may be displayed or may move for a same amount of time or different amounts of time. For example, the triangle may be displayed for 0.3 seconds, the horizontal line may move upward for 0.4 seconds, the square may be displayed for 0.1 seconds, or the horizontal line may move downward for 0.2 seconds. This is not limited in this application. In addition, during specific implementation, auxiliary graphics in FIG. 10 may be omitted and not be displayed.

For example, FIG. 11 shows shapes of visual stimulus constituent elements in another hybrid stimulation pattern. Scattered dots are used as an example for all the visual stimulus constituent elements. In a motion stimulation pattern, the scattered dots may suddenly spread out or suddenly converge to implement stimulation. In a motion stimulation pattern, the scattered dots may rotate clockwise or counterclockwise to implement stimulation. In addition, a color of the scattered dots may also be designed. The scattered dots may be in any color. Optionally, the scattered dots in different stimulation patterns may be in different colors or a same color. Table 2 shows an example of stimulation timings in the hybrid stimulation pattern.

stimulation pattern and the element jump stimulation pattern are combined, a pattern in which the motion stimulation pattern and the element jump stimulation pattern are combined, and a pattern in which the blinking stimulation pattern, the motion stimulation pattern, and the element jump stimulation pattern are combined. For specific combinations, refer to, for example, the foregoing descriptions about FIG. 9, FIG. 10, Table 1, FIG. 11, and Table 2. Details are not described again using examples.

With any one of the foregoing designs of calibration stimuli, novelty of visual stimulation can be improved, and electroencephalography signals with high signal-to-noise ratios can be further evoked, increasing accuracy in identifying different electroencephalography signal characteristics, and further increasing accuracy in identifying the operational intent of the user. Particularly, vision of the user is stimulated in the hybrid stimulation patterns, further improving novelty of visual stimulation, and reducing a repetition-caused suppression effect, that is, inhibiting an

TABLE 2

| Sub-time window | t0 | t1 | t2 | t3 |
|---|---|---|---|---|
| Duration | 0.6 seconds | 0.4 seconds | 1 second | 1 second |
| Blinking stimulation pattern | | The scattered dots spreading out for 0.2 seconds | The scattered dots absent for 0.2 seconds | | The scattered dots converging for 0.6 seconds | The scattered dots absent for 0.4 seconds |
| Motion stimulation pattern | The scattered dots rotating counterclockwise for 0.3 seconds | The scattered dots absent for 0.3 seconds | | The scattered dots rotating clockwise for 0.5 seconds | The scattered dots absent for 0.5 seconds | |

It can be learned from Table 2 that in the hybrid stimulation pattern, it is assumed that total stimulation duration is 3 seconds, and the 3-second time window is divided into four sub-time windows. In a first sub-time window (t0) and a third sub-time window (t2), the motion stimulation pattern works. In a second sub-time window (t1) and a fourth sub-time window (t3), the blinking stimulation pattern works. Specifically, in the first sub-time window, a method of the scattered dots rotating counterclockwise is used to stimulate vision, and the scattered dots disappear after keeping rotating for 0.3 seconds; in the second sub-time window, a method of the scattered dots spreading out is used to stimulate vision, and the scattered dots disappear after keeping spreading out cyclically for 0.2 seconds; in the third sub-time window, a method of the scattered dots rotating clockwise is used to stimulate vision, and the scattered dots disappear after keeping rotating for 0.5 seconds; and in the fourth sub-time window, a method of the scattered dots converging is used to stimulate vision, and the scattered dots disappear after keeping converging cyclically for 0.6 seconds.

It should be noted that none of the total stimulation duration, the duration of each sub-time window, and the duration of each stimulation in Table 2 is limited. In addition, the hybrid stimulation patterns shown in FIG. 10, Table 1, FIG. 11, and Table 2 are merely examples in this application, and do not constitute a limitation on this application.

In a possible implementation, the visual stimulation pattern may further include a pattern in which the blinking effect that an electroencephalography signal is attenuated due to repeated displays of a same stimulation pattern.

Figure 12A:
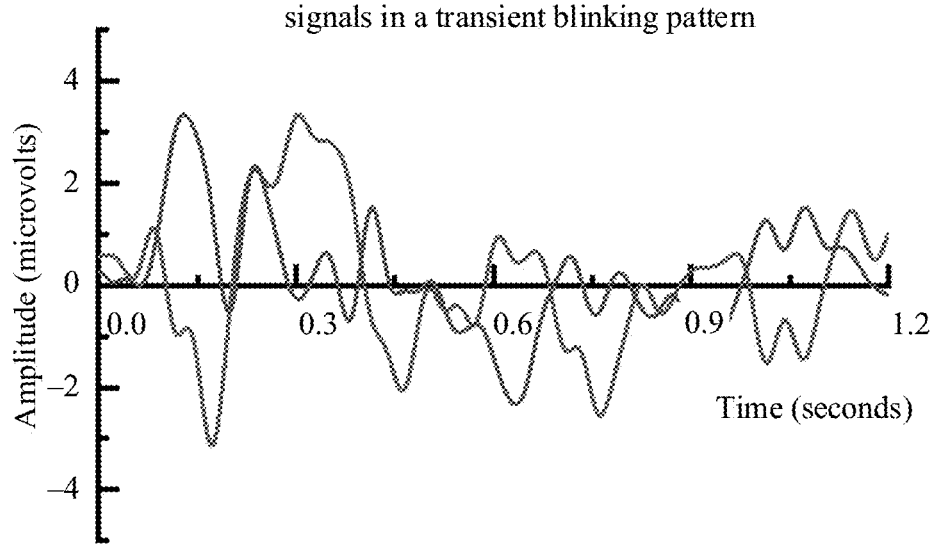
FIG. 12A, FIG. 12B, and FIG. 12C are schematic diagrams of characteristic waveforms of electroencephalography signals according to this application.
Figure 12B:
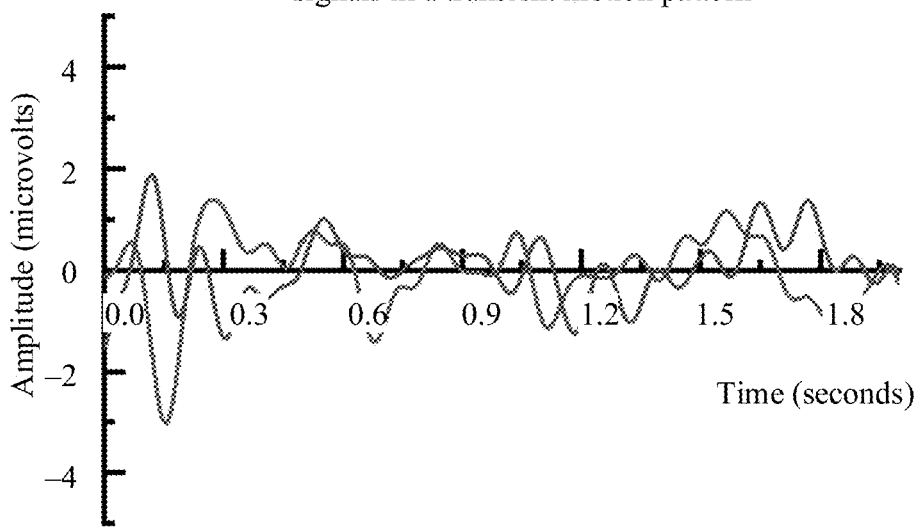
Figure 12C:
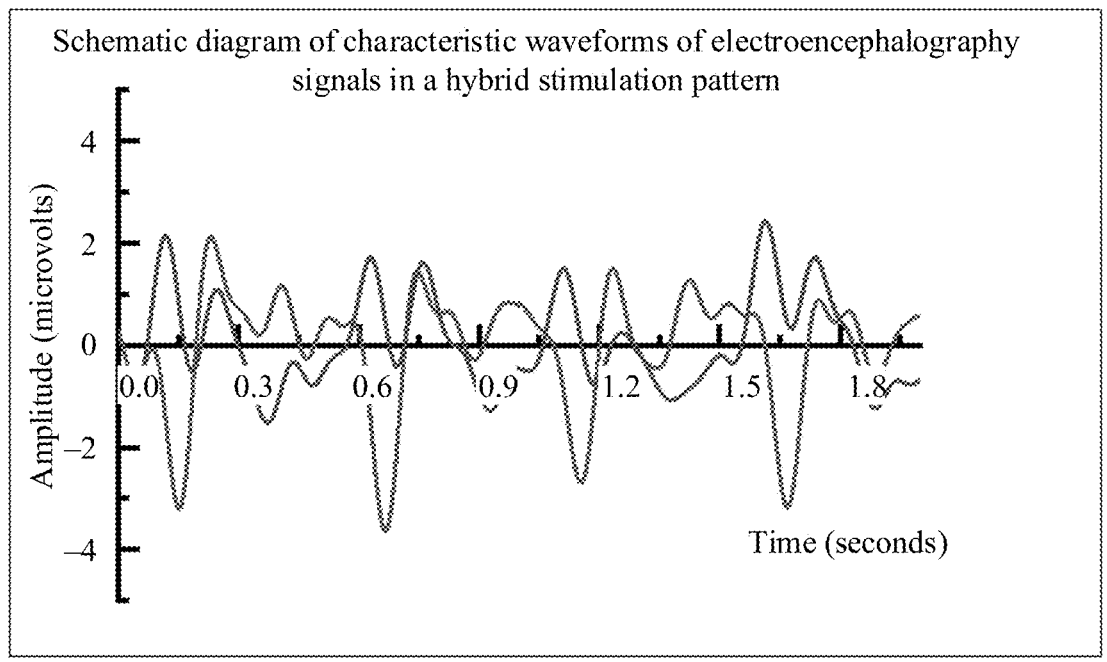

For ease of understanding the repetition-caused suppression effect, refer to FIG. 12A to FIG. 12C. FIG. 12A is a schematic diagram of characteristic waveforms of two electroencephalography signals generated under stimulation in a blinking stimulation pattern. It can be learned that amplitudes of the electroencephalography signals generated under stimulation in the same pattern decrease gradually over stimulation time, that is, the generated electroencephalography signals increasingly weaken over stimulation time. FIG. 12B is a schematic diagram of characteristic waveforms of two electroencephalography signals generated under stimulation in a motion stimulation pattern. Likewise, it can be learned that amplitudes of the electroencephalography signals generated under stimulation in the same pattern decrease gradually over stimulation time, that is, the generated electroencephalography signals increasingly weaken over stimulation time. FIG. 12C is a schematic diagram of characteristic waveforms of two electroencephalography signals generated under stimulation in a hybrid stimulation pattern. It can be learned that amplitudes of the electroencephalography signals generated under stimulation in the hybrid stimulation pattern do not decrease over stimulation time, and large amplitudes can still be maintained. It can be learned from comparisons between FIG. 12A, FIG. 12B, and FIG. 12C that when the hybrid stimulation pattern is used, a repetition-caused suppression effect can be effectively reduced, and signal-to-noise ratios of the electroencephalography signals can be increased, further increasing accuracy in identifying the electroencephalography signals and improving decoding efficiency.

In a possible implementation, based on any one of the foregoing described calibration stimuli designed in this application, the visual stimulus region may be designed in a range of a viewing angle of the user, where a value of the viewing angle is a third preset angle. For example, the third preset angle may be 1° or 1.5°. The third preset angle is not greater than 2°. The visual stimulus region designed in this way is small in size and provides low stimulation strength, reducing strong stimulation to the vision of the user and reducing visual fatigue of the user. Because the foregoing described calibration stimuli designed in this application are used, the user can still be induced to generate stable electroencephalography signals with high signal-to-noise ratios, although the stimulus region is small in size and provides low stimulation strength. In this way, accuracy in identifying electroencephalography signal patterns can be increased, and further, accuracy in determining an intended operational command of the user can be increased. Optionally, in a specific embodiment, the third preset angle may be measured by a device such as a sensor.

In a possible implementation, a size of the visual stimulus region may increase as a distance between eyes of the user and the human-computer interface increases, and/or decrease as the distance between the eyes of the user and the human-computer interface decreases.

In conclusion, based on the retina-cortex mapping principle, the novel human-computer interaction paradigm is designed in this application. Electroencephalography signals with different spatiotemporal distribution characteristics can be evoked by the user gazing at regions in different directions around the visual stimulus region. Operational commands that the user intends to deliver are determined by identifying patterns of the electroencephalography signals. In this way, a function that a plurality of different operational commands are delivered based on a single visual stimulus region can be implemented. In addition, the operational commands can be executed continuously, avoiding interference and discomfort caused to the vision of the user by a need to gaze at a plurality of visual stimuli in an existing technical solution.

Based on the human-computer interaction method described above, the following describes examples of applications of the human-computer interaction method with reference to specific application scenarios.

In a possible implementation, the visual stimulus region overlaps the display region of the operable object, and the different electroencephalography signals in step 402 are used to indicate to execute different operational commands on the operable object. Optionally, the plurality of regions are regions that are distributed in a plurality of directions centering around the visual stimulus region. The different electroencephalography signals are specifically used to indicate the operable object to move towards different directions of the plurality of directions. The first region in step 402 is a region distributed in a first direction, and the first direction is one of the plurality of directions. For ease of understanding the plurality of directions, refer to FIG. 13.

Figure 13:
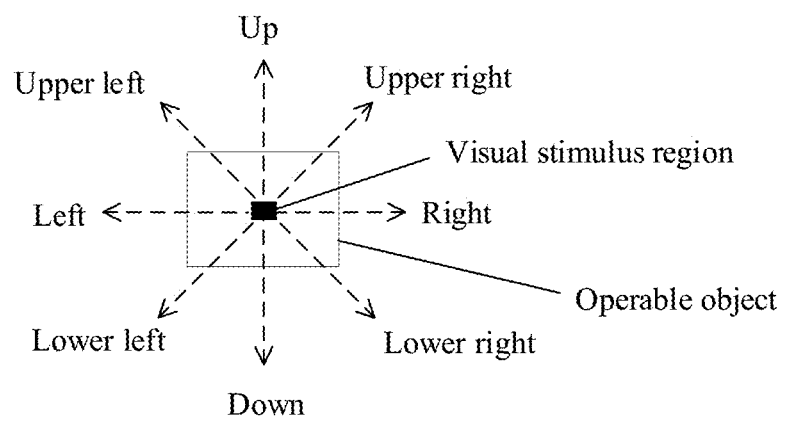
FIG. 13 is a schematic diagram of a plurality of directions around a visual stimulus region according to this application.

FIG. 13 shows an example of a plurality of directions centering around a visual stimulus region. The visual stimulus region may overlap a display region of an operable object. The plurality of directions are directions that are determined from a point of view of a user when the user faces a human-computer interface and looks at the visual stimulus region. Specifically, as shown in FIG. 13, the plurality of directions may include eight directions: up, down, left, right, upper left, lower left, upper right, and lower right. When the user intends to move the operable object towards a direction, the user only needs to gaze at a corresponding position or region in the direction around the visual stimulus region that is superimposed and displayed on the operable object. In this way, an operational instruction is delivered. It should be noted that the directions shown in FIG. 13 are merely an example. During specific implementation, a quantity and specific angles of the plurality of directions are not limited.

For example, application to VR/AR glasses is used as an example for description.

In the scenario of application to VR/AR glasses, the data collection module, the data processing module, and the visual presentation module described above are all deployed in the VR/AR glasses. After a user wears the VR/AR glasses, the visual presentation module in the VR/AR glasses may present a human-computer interface to the user. The human-computer interface includes an operable object and a visual stimulus region. When the user gazes at a region around the visual stimulus region, an electroencephalography signal is evoked. The data collection module in the VR/AR glasses collects the electroencephalography signal of the user. The data processing module in the VR/AR glasses identifies a pattern of the electroencephalography signal to determine an intended operational command of the user, and then transfers the operational command to the visual presentation module for execution. The visual presentation module presents an execution result in the human-computer interface. For ease of understanding an entire process, refer to, for example, FIG. 14A.

Figure 14A:
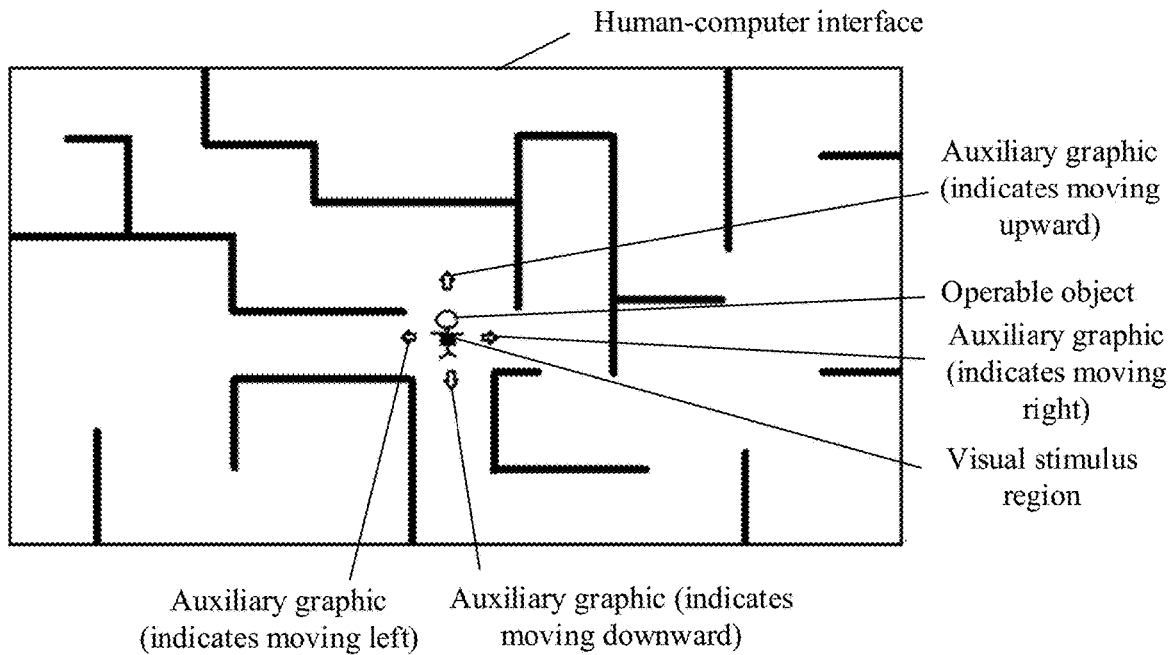
FIG. 14A and FIG. 14B are schematic diagrams of human-computer interfaces according to this application.
Figure 14B:
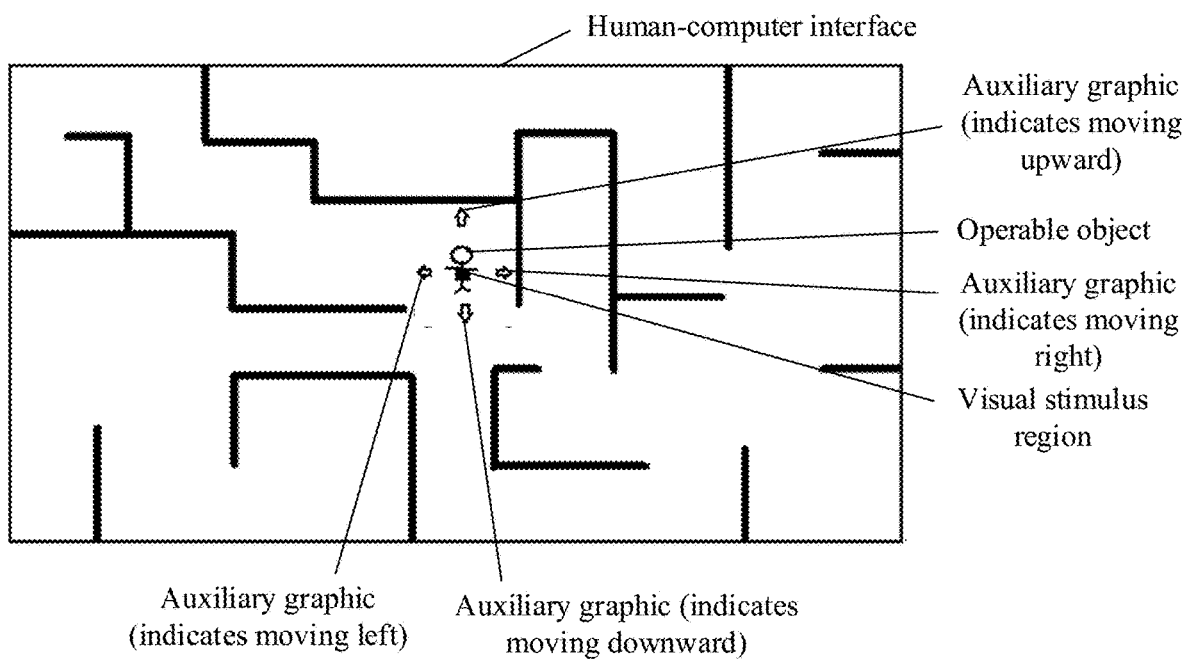

In FIG. 14A, a practical application scenario, which is a game map in a VR environment, is used as an example. For example, an interface shown in FIG. 14A is a human-computer interface that a user sees after wearing VR/AR glasses. An operable object in the human-computer interface is a character. A visual stimulus region is superimposed on a display region of the operable object. Four auxiliary graphics are also displayed around the visual stimulus region or around the operable object. The four auxiliary graphics separately indicate to move towards four directions of up, down, left, and right (as shown in FIG. 14A). During specific implementation, the four auxiliary graphics may be omitted and not be displayed. For example, the user intends to move the operable object upward. The user may gaze at the auxiliary graphic that indicates moving upward (when the auxiliary graphic is omitted and not displayed, the user may gaze at a position or region in which the auxiliary graphic indicating moving upward is located). In this case, the visual stimulus region is on an inferior side in a field of view of the user. The visual stimulus region induces the user to generate an electroencephalography signal with a corresponding spatiotemporal distribution characteristic. A data collection module in the VR/AR glasses collects the electroencephalography signal generated upon operational intent of the user, performs preprocessing operations such as analog signal processing (such as denoising and amplification) and A/D conversion, and then sends the preprocessed signal to a data processing module. The data processing module may process and identify the characteristic of the electroencephalography signal based on the retina-cortex mapping principle and electroencephalography signal decoding principle and algorithm described above, determine a relative spatial positional relationship between the position at which the user gazes and the visual calibration stimulus, and further, determine that an operational instruction that the user intends to deliver is moving the operable object upward. The data processing module then notifies the specific operational command to a visual presentation module in the VR/AR glasses. The visual presentation module executes the operational command and displays an execution result in the human-computer interface. For example, for the human-computer interface in which the execution result is displayed, refer to FIG. 14B. It can be learned that compared to the operable object in FIG. 14A, the operable object in FIG. 14B is moved up.

In a possible implementation, application to a smart screen is used as an example for description. In this application scenario, by gazing at a region around a visual stimulus region on the smart screen, a user can deliver an operational command, such as: dragging a window, resizing an operable object (for example, resizing a window, resizing a picture, resizing a display region of a character, or resizing buttons of an on-screen keyboard), sliding to control a button position, adjusting a video playback progress bar, or adjusting a volume bar.

In the scenario of application to a smart screen, the data collection module described above may be deployed in a collector with electroencephalography sensors that is separately worn on a user's head. Optionally, the collector may be integrated into a wearable device such as glasses or a headset, or may be in another form of hardware that is separately worn on a user's head. This is not limited in this application. The data processing module and the visual presentation module may be deployed in the smart screen. The collector communicates with the smart screen using a wireless network.

After wearing the collector with electroencephalography sensors on the head, the user may gaze at a human-computer interface presented by the smart screen. The human-computer interface includes an operable object and a visual stimulus region. When the user gazes at a region around the visual stimulus region, an electroencephalography signal is evoked. The collector collects the electroencephalography signal of the user and then sends the collected electroencephalography signal to the smart screen. The data processing module in the smart screen identifies a spatiotemporal distribution characteristic of the electroencephalography signal to determine an intended operational command of the user, and then transfers the operational command to the visual presentation module for execution. The visual presentation module presents an execution result in the human-computer interface. For ease of understanding an entire process, refer to, for example, FIG. 15A.

Figure 15A:
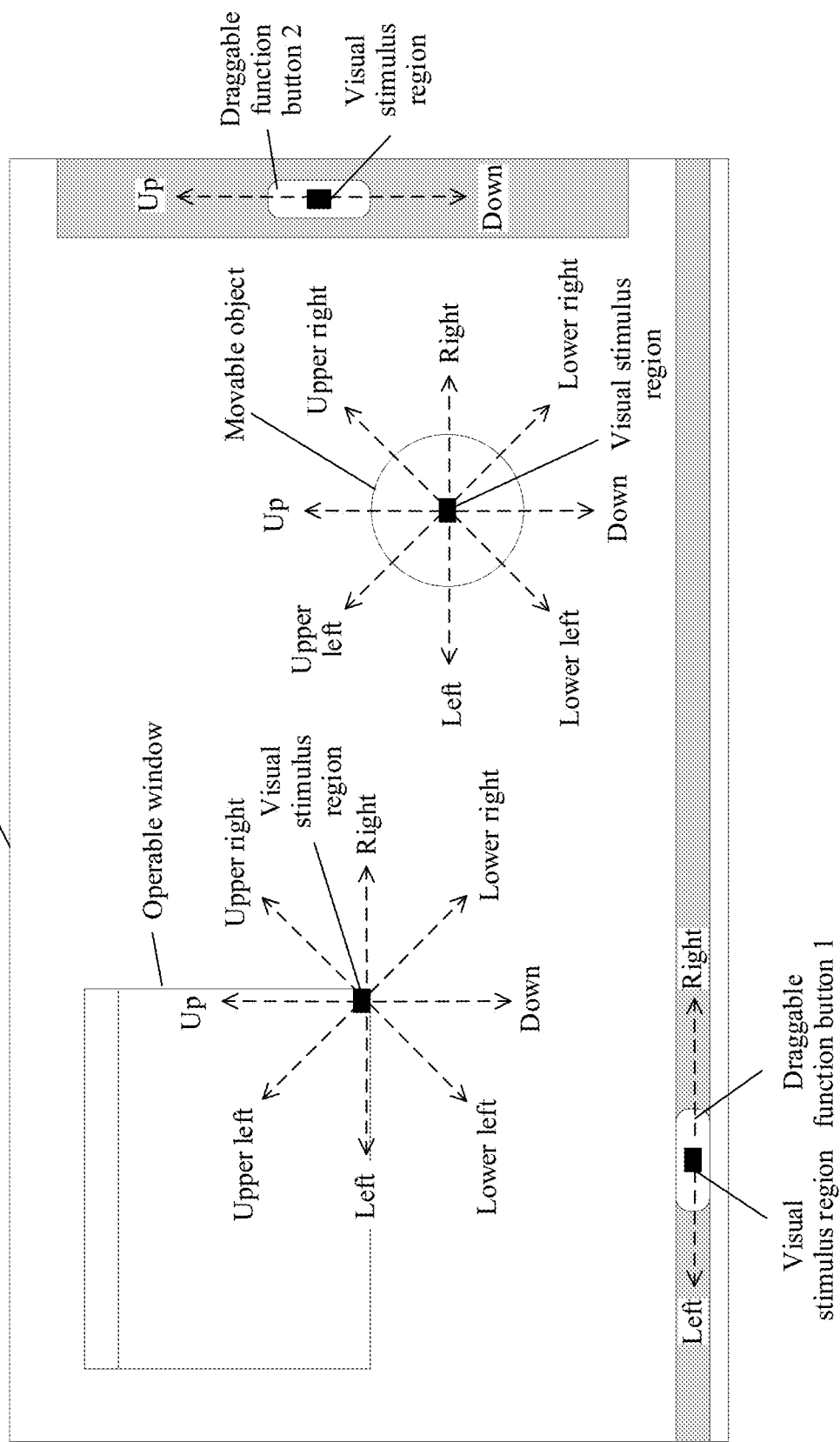
FIG. 15A and FIG. 15B are schematic diagrams of human-computer interfaces according to this application.

An interface shown in FIG. 15A is a human-computer interface displayed by a smart screen. The human-computer interface shows an example of a plurality of operable objects. The plurality of operable objects include an operable window, a movable object (for example, an icon on a home screen), and draggable function buttons (for example, a volume button or a video playback progress bar). It should be noted that the plurality of operable objects may not all be displayed in one human-computer interface in an actual application scenario. In addition, a visual stimulus region is superimposed and displayed on a display region of each of the plurality of operable objects. The visual stimulus region may be superimposed and displayed anywhere in the display region of the operable object. This is not limited in this application. FIG. 15A also shows examples of a plurality of directions centering around a visual stimulus region. For a description of the plurality of directions, refer to the foregoing description of FIG. 13. Details are not described herein again.

A draggable function button 1 in FIG. 15A is used as an example. When the user intends to slide the draggable function button 1 to the right, the user may gaze at a region in a direction of a right side of the draggable function button 1. Due to stimulation caused by the visual stimulus region superimposed on the draggable function button 1, the user generates an evoked electroencephalography signal. The collector worn on the user's head collects the electroencephalography signal, performs preprocessing, and then sends the preprocessed signal to the data processing module. The data processing module identifies a spatiotemporal distribution characteristic of the electroencephalography signal based on the retina-cortex mapping principle and the electroencephalography signal decoding algorithm, then determines that a direction in which the position at which the user gazes is relative to the visual stimulus region superimposed on the draggable function button 1 is a right direction, and further, decodes that an operation that the user intends to perform on the draggable function button 1 is sliding to the right. The visual presentation module performs the operation and displays an execution result in the human-computer interface.

The movable object in FIG. 15A is used as an example. When the user intends to move the movable object to the upper right, the user may gaze at a region in a direction of an upper right side of the movable object. Due to stimulation caused by the visual stimulus region superimposed on the movable object, the user generates an evoked electroencephalography signal. The collector worn on the user's head collects the electroencephalography signal, performs preprocessing, and then sends the preprocessed signal to the data processing module. The data processing module identifies a spatiotemporal distribution characteristic of the electroencephalography signal based on the retina-cortex mapping principle and the electroencephalography signal decoding algorithm, then determines that a direction in which the position at which the user gazes is relative to the visual stimulus region superimposed on the movable object is an upper right direction, and further, decodes that an operation that the user intends to perform on the movable object is moving to the upper right. The visual presentation module performs the operation and displays an execution result in the human-computer interface.

Figure 15B:
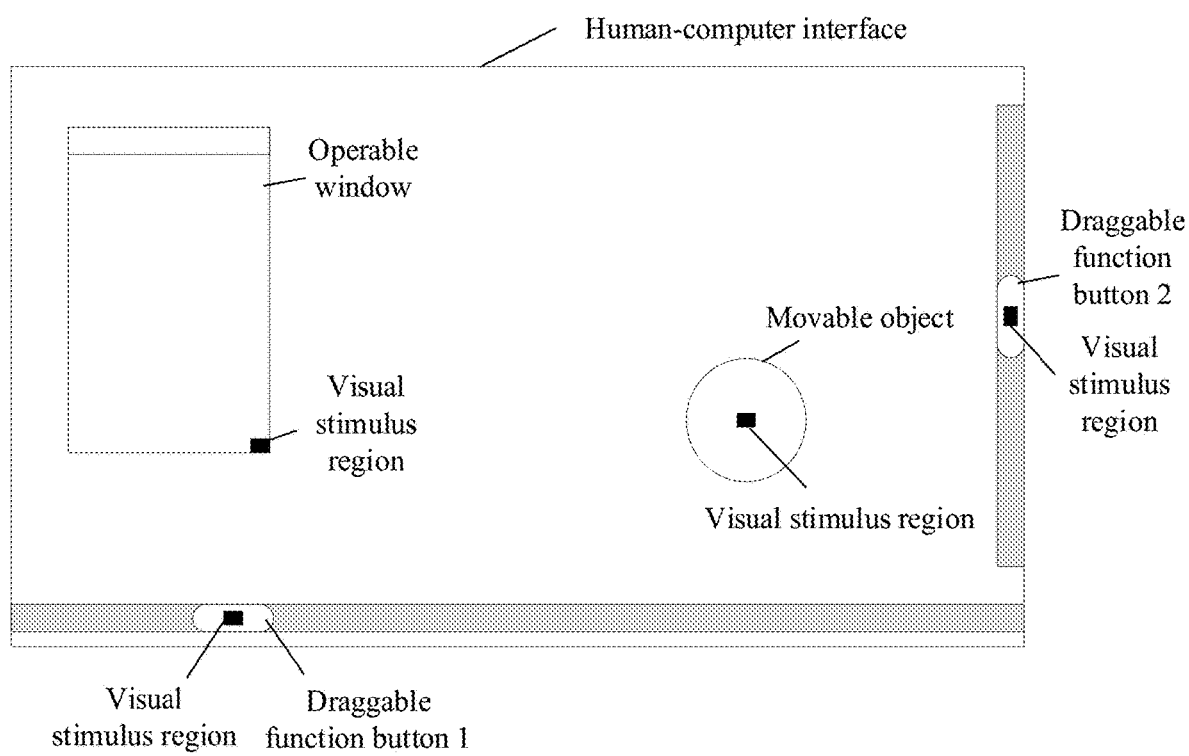

The operable window in FIG. 15A is used as an example. When the user intends to stretch the operable window to the lower left, the user may gaze at a region in a direction of a lower left side of the operable window. Due to stimulation caused by the visual stimulus region superimposed on the operable window, the user generates an evoked electroencephalography signal. The collector worn on the user's head collects the electroencephalography signal, performs preprocessing, and then sends the preprocessed signal to the data processing module. The data processing module identifies a spatiotemporal distribution characteristic of the electroencephalography signal based on the retina-cortex mapping principle and the electroencephalography signal decoding algorithm, then determines that a direction in which the position at which the user gazes is relative to the visual stimulus region superimposed on the operable window is a lower left direction, and further, decodes that an operation that the user intends to perform on the operable window is stretching to the lower left. The visual presentation module performs the operation and displays an execution result in the human-computer interface. For the human-computer interface with the operable window stretched to the lower left, refer to, for example, FIG. 15B. It can be learned that compared to the operable window shown in FIG. 15A, the operable window shown in FIG. 15B is stretched to the lower left.

It should be noted that the human-computer interfaces in FIG. 14A, FIG. 14B, FIG. 15A, and FIG. 15B, the directions in which the regions at which the user gazes are relative to the visual stimulus regions, the intended operations of the user, and the like are merely examples, and do not constitute a limitation on this application.

In a possible implementation, the human-computer interface displayed by the visual presentation module to the user may include a plurality of visual stimulus regions, the first region in step 402 may be one of a plurality of regions around the plurality of visual stimulus regions, the first signal in step 402 may include a plurality of electroencephalography signals that are generated when the plurality of visual stimulus regions stimulate the vision of the user, and the plurality of electroencephalography signals may separately indicate positional relationships between the first region and the plurality of visual stimulus regions. Specifically, the first operational command in step 402 is determined based on the first region at which the user gazes. The first region is determined based on the plurality of electroencephalography signals. To be specific, the region or position at which the user gazes is located based on a combination of the electroencephalography signals evoked by the plurality of visual stimulus regions.

Optionally, when the human-computer interface includes a plurality of visual stimulus regions, visual stimuli in any two of the plurality of visual stimulus regions are different. That visual stimuli are different includes that visual stimulus constituent elements in the any two visual stimulus regions are different in one or more of shape, color, shading, or visual stimulation pattern.

Figure 16:
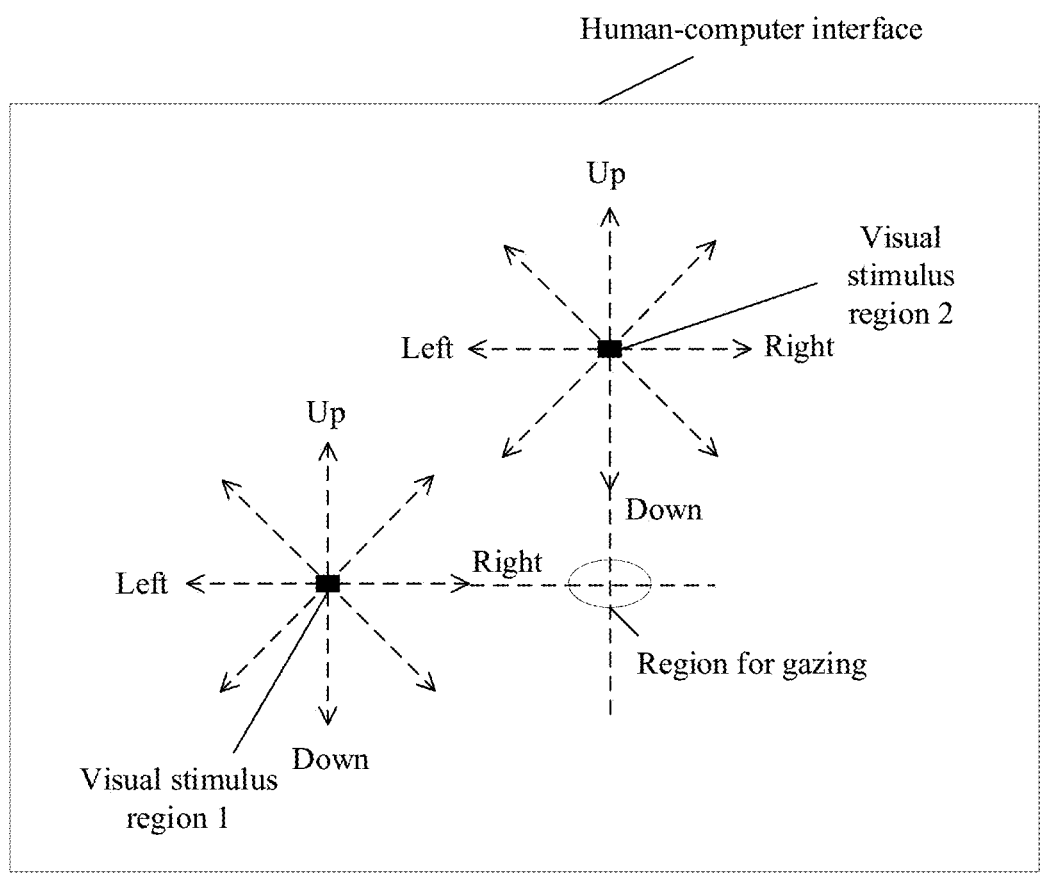
FIG. 16 is a schematic diagram of locating a region for gazing according to this application.

For ease of understanding that the region or position at which the user gazes is located based on a combination of the electroencephalography signals evoked by the plurality of visual stimuli, refer to, for example, FIG. 16. In FIG. 16, electroencephalography signals evoked by two visual stimuli are used as an example to describe how to locate, based on a combination, a region or position at which a user gazes. A human-computer interface shown in FIG. 16 includes a visual stimulus region 1 and a visual stimulus region 2, and shows an example of a plurality of directions centering around the visual stimulus regions. For a description of the plurality of directions, refer to the foregoing description of FIG. 13. Details are not described herein again. FIG. 16 further shows an example of the region at which the user gazes. It is assumed that the region for gazing is in a direction of a right side of the visual stimulus region 1 and in a direction of a lower side of the visual stimulus region 2. When the user gazes at the region for gazing in FIG. 16, due to stimulation caused by the visual stimulus region 1 and based on the retina mapping principle described above, a data collection module may collect an evoked electroencephalography signal on a left side of a primary visual cortex of the user. Through analysis and decoding performed by a data processing module, it can be determined that the region at which the user gazes is in the direction of the right side of the visual stimulus region 1. In addition, based on stimulation caused by the visual stimulus region 2, the data collection module may collect an evoked electroencephalography signal on a superior side of the primary visual cortex. Through analysis and decoding performed by the data processing module, it can be determined that the region at which the user gazes is in the direction of the lower side of the visual stimulus region 2. Based on these two directions, it is determined that a region at which the two directions intersect after being extended is the region at which the user gazes.

In FIG. 16, only two visual stimulus regions are used as an example for description. When a human-computer interface includes more than two visual stimulus regions, a region at which a user gazes can also be located based on a combination with reference to the manner shown in FIG. 16.

In a possible implementation, when the human-computer interface includes a plurality of visual stimulus regions, a visual stimulus region far away from a position for gazing may be ignored, and the region at which the user gazes is located based on electroencephalography signals evoked by two or more visual stimulus regions close to the position for gazing. Specifically, the data processing module may ignore an electroencephalography signal with a low signal-to-noise ratio, and determine and decode, based on electroencephalography signals with high signal-to-noise ratios, the region at which the user gazes. The electroencephalography signal with a low signal-to-noise ratio is a signal evoked by the visual stimulus region far away from the position for gazing. Due to a long distance, the evoked signal has a low signal-to-noise ratio. The electroencephalography signals with high signal-to-noise ratios are electroencephalography signals evoked by the two or more visual stimulus regions close to the position for gazing. Due to a short distance, the evoked signals have high signal-to-noise ratios.

Based on the foregoing principle of locating, based on a combination of a plurality of visual stimulus regions, a position at which a user gazes, the following describes examples with reference to specific application scenarios.

Optionally, the first region includes a first sub-region and a second sub-region, the plurality of electroencephalography signals include a first sub-signal and a second sub-signal, the first sub-signal is an electroencephalography signal generated when the user gazes at the first sub-region, the second sub-signal is an electroencephalography signal generated when the user gazes at the second sub-region, the first sub-signal precedes the second sub-signal, and that the first operational command is determined based on a first signal in step 402 includes that the first operational command is determined based on both the first sub-signal and the second sub-signal. For ease of understanding, for example, application to a smart screen is used as an example for description. In the application scenario, a position for gazing can be located by the user gazing at regions around a plurality of visual stimulus regions on a smart screen, and further, an operational command such as selecting the operable object can be delivered.

In the scenario of application to a smart screen, for manners in which the data collection module, the data processing module, and the visual presentation module are deployed and communicate, refer to the foregoing descriptions. Details are not described herein again.

After wearing a collector with electroencephalography sensors on the head, the user may gaze at a human-computer interface presented by the smart screen. The human-computer interface includes at least one operable object and a plurality of visual stimulus regions. When intending to operate the at least one operable object, the user may gaze at regions at two ends of any diagonal in a rectangular region formed by display regions of the at least one operable object. In another case, if the at least one operable object that the user intends to operate is in a same row, the user may gaze at regions at two ends of display regions of the at least one object. The collector collects electroencephalography signals evoked by at least two visual stimulus regions around the regions at which the user gazes (each visual stimulus region evokes a corresponding electroencephalography signal), performs preprocessing, and then sends the preprocessed signals to the data processing module. The data processing module locates, based on the foregoing principle of performing locating based on a combination, the two regions at which the user gazes, and then locates an operable object covered by a rectangular region that is formed with center points of the two regions as diagonal points. The visual presentation module displays an operational result of locating (for example, an operational result such as selected) in the human-computer interface.

The selecting manner may be framing a selected region with a colored rectangle, highlighting an entire selected region, underlining a selected object, or the like. This is not limited in this application. The selected operable object may be a picture, text, an icon, or the like. This is not limited in this application either.

Figure 17:
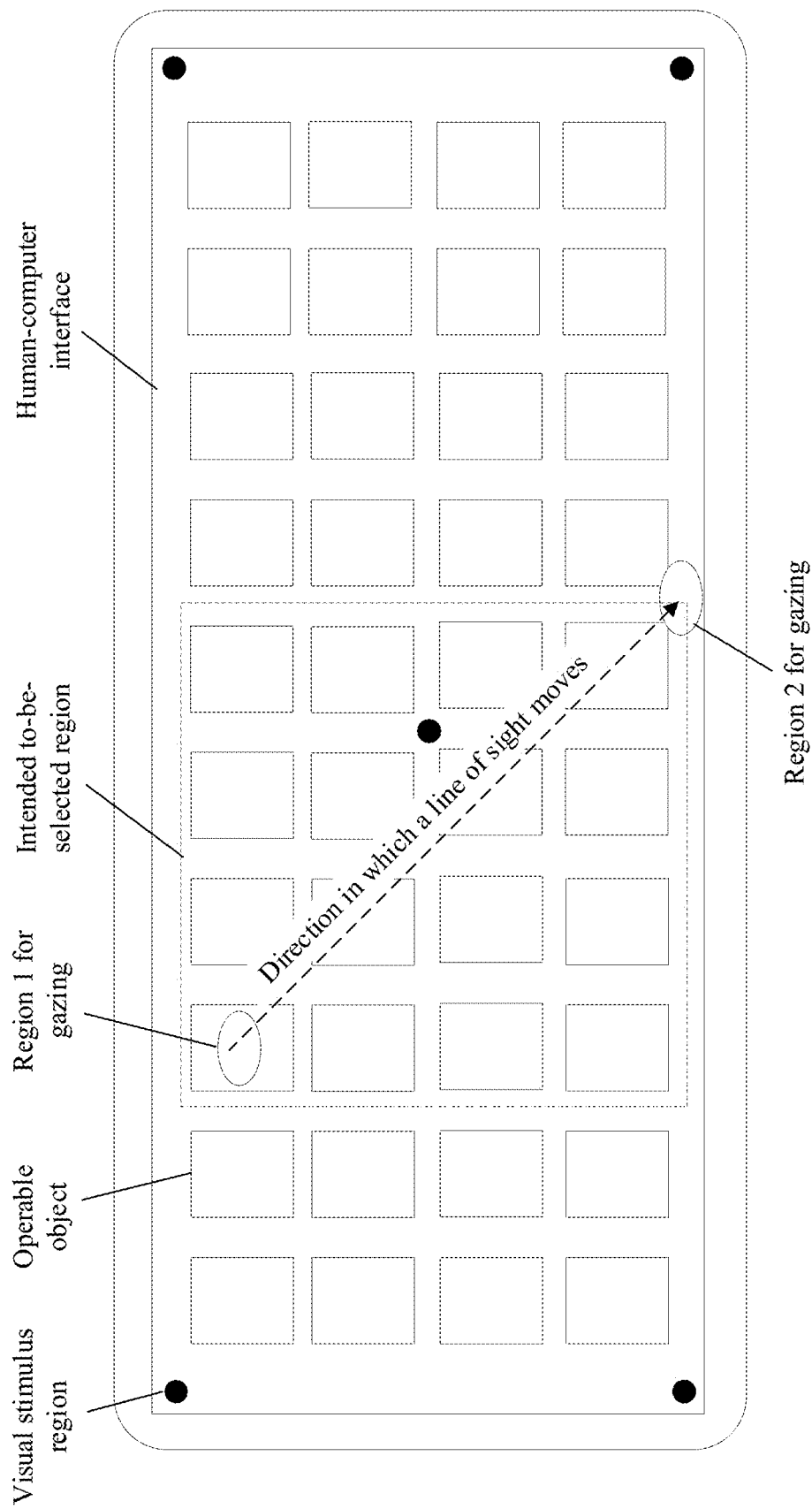
FIG. 17 and FIG. 18 are schematic diagrams of human-computer interfaces according to this application.

For ease of understanding an entire process, refer to, for example, FIG. 17. FIG. 17 shows a human-computer interface displayed on a screen of a mobile terminal (for example, a mobile phone). The human-computer interface shows an example of a plurality of operable objects (small rectangles in the figure) and a plurality of visual stimulus regions (small black dots in the figure). The plurality of operable objects may be pictures, files, icons, or the like. For example, the plurality of visual stimulus regions are deployed in four corners and at a center of the human-computer interface. In FIG. 17, an intended to-be-selected region, a region 1 for gazing, and a region 2 for gazing of a user are also marked.

In the human-computer interface shown in FIG. 17, when the user intends to select the intended to-be-selected region shown in the figure, the user may first gaze at the region 1 for gazing in the figure, and then gaze at the region 2 for gazing in the figure. A plurality of visual stimulus regions around the positions for gazing perform stimulation and evoke electroencephalography signals. A collector collects the electroencephalography signals of the user, performs preprocessing, and then sends the preprocessed signals to a data processing module. The data processing module locates, based on the foregoing principle of performing locating based on a combination, the two regions at which the user gazes, and then selects operable objects covered by a rectangular region that is formed with center points of the two regions as diagonal points, that is, selects objects in the intended to-be-selected region in FIG. 17. Then, a visual presentation module displays a result of being selected in the human-computer interface.

In a possible implementation, after locating the two regions for gazing, the data processing module may calculate a distance between the two positions. If the distance is greater than a preset distance value, the visual presentation module may speed up selection when displaying selected objects. For example, regions around selected objects may be marked in a preset color. In this case, when the distance between the two regions for gazing is greater than the preset distance value, coloring regions around selected objects may be sped up. For example, coloring at a normal selection speed requires 0.1 seconds, whereas a coloring time may be reduced to 0.05 seconds or the like after the speed-up. In this embodiment, an increase in an object selection speed may cause a decrease in a delivery time of an operational command, improving smoothness of a user operation.

In a possible implementation, the first region is the display region of the operable object, and the executing a first operational command on the operable object includes: executing a select operational command on the operable object. For example, in a scenario of application to a smart screen, a select operational command such as highlighting the operable object can be delivered by the user gazing at the display region of the operable object surrounded by a plurality of visual stimulus regions on a smart screen. The highlighting operation may be, for example, zooming in on an operable window, enhancing rendering of a target region, or zooming in on information.

Figure 18:
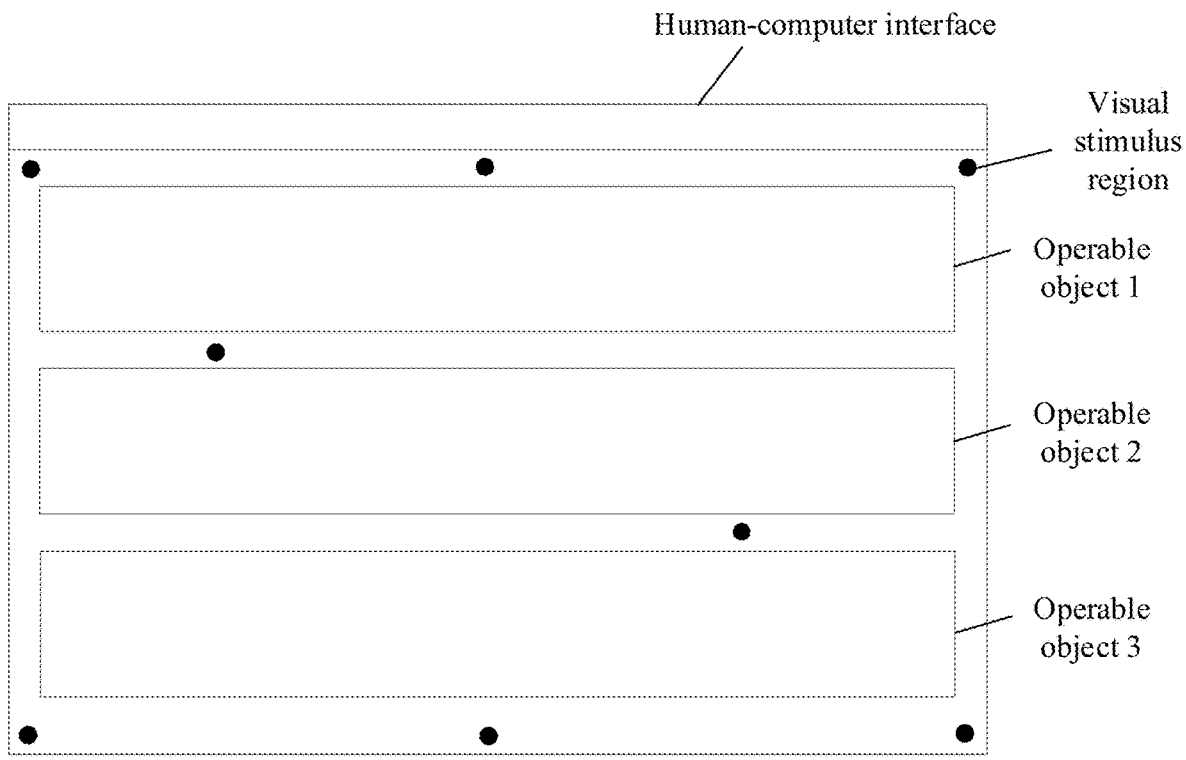

For ease of understanding an entire process, refer to, for example, FIG. 18. FIG. 18 shows a human-computer interface displayed on a smart screen. The human-computer interface shows an example of a plurality of operable objects and a plurality of visual stimulus regions (small black dots in the figure). The plurality of operable objects may be display regions of news headlines, display regions of text, display regions of pictures, or the like. For example, the plurality of visual stimulus regions are deployed in four corners of the human-computer interface and in a plurality of positions in a middle interface. Based on the human-computer interface shown in FIG. 18, an operable object 1 is used as an example. When a region at which a user gazes is the operable object 1, a plurality of visual stimulus regions around the operable object 1 perform stimulation and evoke electroencephalography signals. A collector collects the electroencephalography signals of the user, performs preprocessing, and then sends the preprocessed signals to a data processing module. The data processing module locates, based on the foregoing principle of performing locating based on a combination, the region at which the user gazes, and then selects the operable object 1 in the region at which the user gazes. A visual presentation module highlights the selected operable object 1 in the human-computer interface.

Optionally, some or all of the plurality of visual stimulus regions are provided in edge regions of the human-computer interface. For example, the human-computer interface is in a shape of a polygon, and some or all of the plurality of visual stimulus regions are provided in regions in which a plurality of interior angles of the polygon lie. For ease of understanding, refer to deployment of the plurality of visual stimulus regions in FIG. 17 or FIG. 18. With the visual stimulus regions provided around the human-computer interface, based on the retina mapping principle, any position at which the user gazes in the human-computer interface can be located based on a combination of the plurality of visual stimulus regions.

In a possible implementation, the human-computer interaction method provided in this application may further include: changing the visual stimulation pattern in the visual stimulus region based on a characteristic of the electroencephalography signal of the user.

During specific implementation, when the vision is stimulated in different visual stimulation patterns, the user may experience different sensitivities to visual stimulation in different visual stimulation patterns. For example, for a user A, an electroencephalography signal evoked under visual stimulation in the blinking stimulation pattern has a higher signal-to-noise ratio than an electroencephalography signal evoked under visual stimulation in the motion stimulation pattern. In addition, each user corresponds to a visual stimulation pattern to which the user is highly sensitive. For example, for the user A, an electroencephalography signal with a high signal-to-noise ratio may be evoked when vision is stimulated in the blinking stimulation pattern, whereas for a user B and a user C, an electroencephalography signal with a high signal-to-noise ratio may be evoked when vision is stimulated in the motion stimulation pattern. Therefore, for a purpose of being able to collect an electroencephalography signal with a high signal-to-noise ratio, in this application, each user may be adaptively matched with a visual stimulation pattern to which the user is highly sensitive, based on a characteristic of an electroencephalography signal evoked when the user is under visual stimulation. The characteristic of the electroencephalography signal may be, for example, a signal-to-noise ratio or strength of the electroencephalography signal. The strength may be, for example, an amplitude of a peak or valley of the electroencephalography signal.

In a specific embodiment, a visual stimulation pattern to which each user is more sensitive may be learned through training. For example, vision of the user may be stimulated in different visual stimulation patterns in advance, to evoke different electroencephalography signals, and signal-to-noise ratios of the different electroencephalography signals may be compared to determine a visual stimulation pattern to which the user is more sensitive. Optionally, for a user for whom a visual stimulation pattern to which the user is more sensitive is determined, information about the visual stimulation pattern to which the user is more sensitive may be stored in association with information about the user, so that the visual stimulation pattern to which the user is more sensitive is quickly found when the user performs human-computer interaction next time, and a visual stimulus is displayed in a human-computer interface in the pattern. When a user who is more sensitive to a different visual stimulation pattern performs human-computer interface interaction, a visual presentation module may quickly adjust a visual stimulation pattern in a visual stimulus region in a human-computer interface to a visual stimulation pattern to which the user is more sensitive.

Optionally, a visual stimulation pattern to which a user is more sensitive may be alternatively specified by the user, and then information about the specified visual stimulation pattern to which the user is more sensitive may be stored in association with information about the user for subsequent use.

It should be noted that the changing the visual stimulation pattern in the visual stimulus region in this embodiment may be changing between the blinking stimulation pattern, the motion stimulation pattern, and the element jump stimulation pattern; or may be changing a visual stimulus constituent element in the blinking stimulation pattern, the motion stimulation pattern, or the element jump stimulation pattern, for example, changing at least one of a color, a shape, and shading; or the like.

In this embodiment of this application, the visual stimulation pattern displayed in the human-computer interface is adjusted adaptively. In this way, user electroencephalography signals with high signal-to-noise ratios can be evoked, increasing accuracy in identifying spatiotemporal distribution characteristics of electroencephalography signals, and further increasing accuracy in identifying an intended operational command of the user.

In conclusion, the novel brain-computer interface interaction method designed in this application is used in this embodiment of this application. Compared with the conventional technology, the novel brain-computer interface interaction method has the following characteristics: An operable object and a center of a visual stimulus do not overlap, a calibration module that is small in size and provides weak stimulation is used for visual stimulation, and a user can deliver an operational instruction by gazing at a region around a visual calibration stimulus. The user does not need to gaze directly at the stimulus, reducing interference caused to the user, providing user-friendly visual experience, unlikely causing visual fatigue to the user, and allowing long-time use. In addition, compared with the conventional technology, a visual calibration stimulus paradigm designed in the present invention can implement that a single visual stimulus corresponds to a plurality of operational commands. A relative spatial positional relationship, namely, up, down, left, and right, between a position at which the user is gazing and the visual calibration stimulus is determined based on that spatiotemporal distribution characteristics of electroencephalography signals evoked when the user gazes at different positions around the visual calibration stimulus are specific when the visual calibration stimulus is not in a center of a line of sight of the user. The position at which the user gazes is efficiently decoded based on the retina-cortex mapping principle. In particular, when the visual calibration stimulus design method designed in the present invention is used, for the visual calibration stimulus, at least two basic stimulation patterns of the blinking stimulation pattern, the motion stimulation pattern, and the element jump stimulation pattern are mixed in series, and novel stimulation is used in each pattern, significantly reducing a repetition-caused suppression effect, providing electroencephalography spatial characteristics with high signal-to-noise ratios for decoding, and increasing a decoding speed and accuracy.

The foregoing mainly describes the human-computer interaction method provided in embodiments of this application. It may be understood that to implement the foregoing corresponding functions, each device includes corresponding hardware structures and/or software modules that perform the functions. With reference to the units and steps in the examples described in embodiments disclosed in this specification, this application can be implemented in a form of hardware or a combination of hardware and computer software. Whether a function is performed by hardware or by computer software driving hardware depends on particular applications and design constraints of the technical solutions. A professional technical person may use different methods to implement the described functions for each particular application, but it should not be considered that the implementation goes beyond the scope of this application.

In embodiments of this application, a device may be divided into functional modules based on the foregoing method examples. For example, each functional module may be obtained through division based on each corresponding function, or two or more functions may be integrated into one module. The integrated module may be implemented in a form of hardware, or may be implemented in a form of a software functional module. It should be noted that in embodiments of this application, division into modules is an example, and is merely logical function division. During actual implementation, another division manner may be used.

Figure 19:
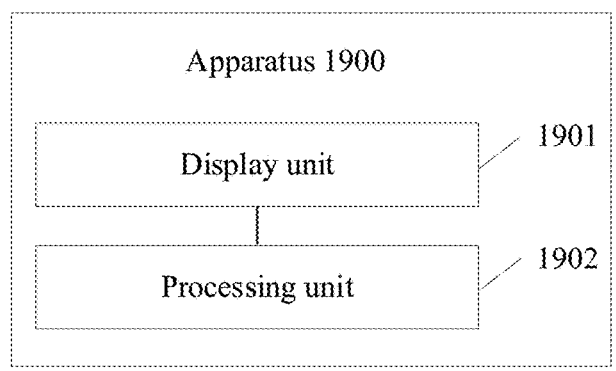
FIG. 19 is a schematic diagram of a logical structure of an apparatus according to this application.

When each functional module is obtained through division based on each corresponding function, FIG. 19 is a schematic diagram of a possible logical structure of an apparatus. The apparatus may be the visual presentation module or VR/AR glasses used in the method in FIG. 4 and the possible implementations of the method, or may be a chip in the visual presentation module or VR/AR glasses, or may be a processing system in the visual presentation module or VR/AR glasses, or the like. The apparatus 1900 includes a display unit 1901 and a processing unit 1902.

The display unit 1901 is configured to display a human-computer interface. The human-computer interface includes an operable object and a visual stimulus region. The display unit 1901 may perform the operation in step 401 shown in FIG. 4.

The processing unit 1902 is configured to execute a first operational command on the operable object. The first operational command is determined based on a first signal. The first signal is an electroencephalography signal generated when a user gazes at a first region. The first region is one of a plurality of regions around the visual stimulus region. Different electroencephalography signals are generated when the user gazes at different regions of the plurality of regions. The different electroencephalography signals indicate to execute different operational commands related to the operable object. The processing unit 1902 may perform the operation in step 402 shown in FIG. 4.

In a possible implementation, the different electroencephalography signals appear in different regions in a primary visual cortex, and the first region is determined based on a region in which the electroencephalography signal appears in the primary visual cortex.

In a possible implementation, a visual stimulation pattern in the visual stimulus region includes a blinking stimulation pattern, a motion stimulation pattern, an element jump stimulation pattern, or a hybrid stimulation pattern. The hybrid stimulation pattern is a stimulation pattern in which at least two patterns of the blinking stimulation pattern, the motion stimulation pattern, and the element jump stimulation pattern are combined.

The blinking stimulation pattern is a stimulation pattern in which a visual stimulus constituent element in the visual stimulus region sometimes appears and sometimes disappears. The motion stimulation pattern is a stimulation pattern in which a visual stimulus constituent element in the visual stimulus region moves in a preset direction and on a preset trajectory. The element jump stimulation pattern is a stimulation pattern in which at least one of a shape, a color, and shading of a visual stimulus constituent element in the visual stimulus region continuously changes.

In a possible implementation, the hybrid stimulation pattern includes a stimulation pattern in which at least two stimulation patterns of the blinking stimulation pattern, the motion stimulation pattern, and the element jump stimulation pattern are presented alternately.

In a possible implementation, the at least two stimulation patterns include a first stimulation pattern, and the first stimulation pattern is one of the blinking stimulation pattern, the motion stimulation pattern, and the element jump stimulation pattern; and the first stimulation pattern is displayed at least twice, where visual stimuli presented when the first stimulation pattern is displayed for the first time and the second time are different.

In a possible implementation, the visual stimulus region is in a range of a 2-degree viewing angle of the user.

In a possible implementation, a size of the visual stimulus region increases as a distance between eyes of the user and the human-computer interface increases, and/or decreases as the distance between the eyes of the user and the human-computer interface decreases.

In a possible implementation, the visual stimulus region overlaps a display region of the operable object, the plurality of regions are regions that are distributed in a plurality of directions centering around the visual stimulus region, the first region is a region distributed in a first direction, and the first direction is one of the plurality of directions.

In a possible implementation, the regions in the plurality of directions include at least one auxiliary graphic, the at least one auxiliary graphic is configured to indicate a position for gazing to the user, the first region includes a first auxiliary graphic of the at least one auxiliary graphic, and the first signal is an electroencephalography signal generated when the user gazes at the first auxiliary graphic.

In a possible implementation, the first operational command instructs the operable object to move in the first direction.

In a possible implementation, the first operational command instructs to resize the display region of the operable object towards the first direction.

In a possible implementation, the human-computer interface includes a plurality of visual stimulus regions, the first signal includes a plurality of electroencephalography signals that are generated when the plurality of visual stimulus regions stimulate vision of the user, and the plurality of electroencephalography signals separately indicate positional relationships between the first region and the plurality of visual stimulus regions.

In a possible implementation, the first region includes a first sub-region and a second sub-region, the plurality of electroencephalography signals include a first sub-signal and a second sub-signal, the first sub-signal is an electroencephalography signal generated when the user gazes at the first sub-region, the second sub-signal is an electroencephalography signal generated when the user gazes at the second sub-region, the first sub-signal precedes the second sub-signal, and that the first operational command is determined based on a first signal includes that the first operational command is determined based on both the first sub-signal and the second sub-signal.

In a possible implementation, the first region is the display region of the operable object, and the executing a first operational command on the operable object includes: executing a select operational command on the operable object.

In a possible implementation, the human-computer interface is in a shape of a polygon, and some or all of the plurality of visual stimulus regions are provided in regions in which a plurality of interior angles of the polygon lie.

In a possible implementation, the processing unit 1902 is further configured to: change the visual stimulation pattern in the visual stimulus region based on an electroencephalography characteristic of the user.

For specific operations performed by and beneficial effects of the units in the apparatus 1900 shown in FIG. 19, refer to the corresponding descriptions in FIG. 4 and the possible method embodiments of FIG. 4. Details are not described herein again.

Figure 20:
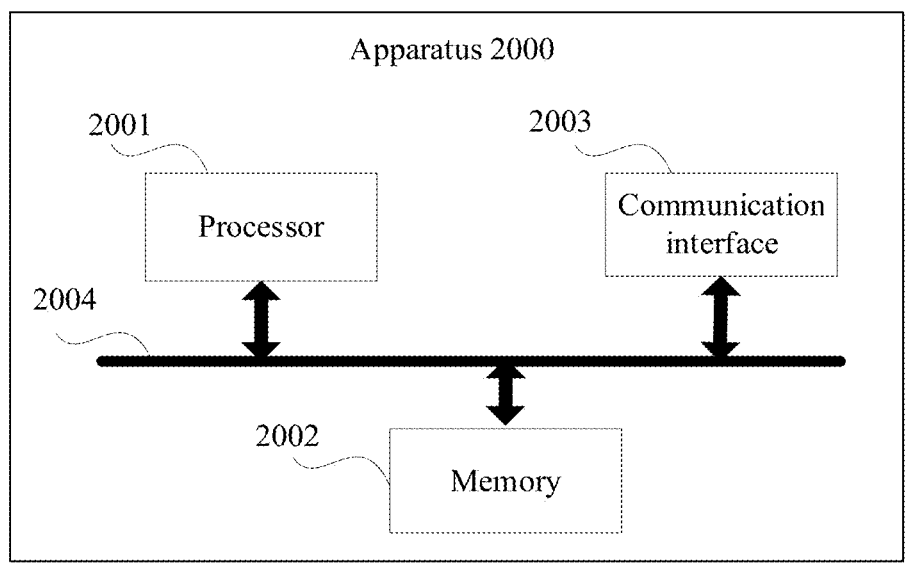
FIG. 20 is a schematic diagram of a physical structure of an apparatus according to this application.

FIG. 20 is a schematic diagram of a possible hardware structure of an apparatus according to this application. The apparatus may be the visual presentation module or VR/AR glasses used in the method in the foregoing embodiment, or the like. The apparatus 2000 includes a processor 2001, a memory 2002, and a communication interface 2003. The processor 2001, the communication interface 2003, and the memory 2002 may be connected to each other, or may be connected to each other via a bus 2004.

For example, the memory 2002 is configured to store a computer program and data of the apparatus 2000. The memory 2002 may include but is not limited to a random access memory (RAM), a read-only memory (ROM), an erasable programmable read only memory (EPROM), or a portable read-only memory (compact disc read-only memory, CD-ROM).

The communication interface 2003 includes a transmit interface and a receive interface. There may be a plurality of communication interfaces 2003. The communication interface 2003 is configured to support the apparatus 2000 in performing communication, for example, receiving or transmitting data, messages, or the like.

For example, the processor 2001 may be a central processing unit, a general-purpose processor, a digital signal processor, an application-specific integrated circuit, a field programmable gate array or another programmable logic device, a transistor logic device, a hardware part, or any combination thereof. Alternatively, the processor 2001 may be a combination of processors implementing a computing function, for example, a combination of one or more microprocessors, or a combination of a digital signal processor and a microprocessor. The processor 2001 may be configured to read the program stored in the memory 2002, to perform any one of the human-computer interaction methods in FIG. 4 and the possible embodiments of FIG. 4.

In a possible implementation, the processor 2001 may be configured to read the program stored in the memory 2002, to perform the following operations:

displaying a human-computer interface, where the human-computer interface includes an operable object and a visual stimulus region; and executing a first operational command on the operable object, where the first operational command is determined based on a first signal, the first signal is an electroencephalography signal generated when a user gazes at a first region, the first region is one of a plurality of regions around the visual stimulus region, different electroencephalography signals are generated when the user gazes at different regions of the plurality of regions, and the different electroencephalography signals indicate to execute different operational commands related to the operable object.

For specific operations performed by and beneficial effects of the units in the apparatus 2000 shown in FIG. 20, refer to the corresponding descriptions in FIG. 4 and the possible method embodiments of FIG. 4. Details are not described herein again.

An embodiment of this application further provides a computer-readable storage medium. The computer-readable storage medium stores a computer program. The computer program is executed by a processor to implement the method according to any one of FIG. 4 and the possible method embodiments of FIG. 4.

An embodiment of this application further provides a computer program product. When the computer program product is read and executed by a computer, the method according to any one of FIG. 4 and the possible method embodiments of FIG. 4 is performed.

In conclusion, in this application, when intending to deliver an operational command, the user does not need to gaze directly at the visual stimulus region. The user can deliver the command by gazing at a region around the visual stimulus region. Compared with an existing technical solution in which a user needs to gaze directly at a visual stimulus region to deliver an operational command, the technical solution in this application can help relieve visual fatigue of the user and improve user experience in a human-computer interaction process. In addition, in this application, when the user gazes at different regions around the visual stimulus region, different electroencephalography signals can be evoked. Therefore, it may be set that the user gazing at different regions around the visual stimulus region indicates that the user intends to deliver different operational commands. To be specific, in this application, it can be implemented that a single visual stimulus corresponds to a plurality of operational commands. When the user needs to continuously deliver a plurality of operational commands, the user does not need to gaze at a plurality of visual stimulus regions. The user can continuously deliver a plurality of operational commands only by gazing at a plurality of regions around the visual stimulus region according to operational intent of the user, reducing operational complexity and improving user experience. Moreover, in the existing solution, one visual stimulus corresponds to one operational command. When there are a plurality of operational commands, a same quantity of visual stimuli need to be displayed in a human-computer interface, increasing a burden on a processor and being complex to implement. In this application, it can be implemented that a single visual stimulus corresponds to a plurality of operational commands. Therefore, display of a visual stimulus region in a human-computer interface can be reduced, a burden on the processor can also be reduced, it is easier to implement, and it is easy to operate.

The foregoing descriptions are merely specific implementations of embodiments of this application, but the protection scope of embodiments of this application is not limited thereto. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A human-computer interaction method applied to an electronic device, the method comprising:
    displaying a human-computer interface, wherein the human-computer interface comprises an operable object and a visual stimulus region;
    executing a first operational command on the operable object, wherein the first operational command is determined based on a first signal, the first signal is an electroencephalography signal generated in response to a user gazing at a first region, the first region is one of a plurality of regions around the visual stimulus region, different electroencephalography signals are generated in response to the user gazing at different regions of the plurality of regions, and the different electroencephalography signals indicate to execute different operational commands related to the operable object; and
    wherein an included angle between a line of sight obtained in response to the user gazing at the first region and a line of sight obtained in response to the user gazing at a center point of the visual stimulus region is in a preset range.

2. The method according to claim 1, wherein the different electroencephalography signals are evoked in different regions in a primary visual cortex in response to the user gazing at the different regions, and the first region is determined based on a region in which the first signal appears in the primary visual cortex.

3. The method according to claim 1, wherein the visual stimulus region overlaps a display region of the operable object;
    the plurality of regions are regions that are distributed in a plurality of directions centering around the visual stimulus region; and
    the first region is a region distributed in a first direction, and the first direction is one of the plurality of directions.

4. The method according to claim 3, wherein the first operational command instructs the operable object to move in the first direction; or
the first operational command instructs to resize the display region of the operable object towards the first direction.

5. The method according to claim 3, wherein the regions in the plurality of directions comprise at least one auxiliary graphic, and the at least one auxiliary graphic is configured to indicate a position for gazing to the user;
the first region comprises a first auxiliary graphic of the at least one auxiliary graphic; and
the first signal is an electroencephalography signal generated in response to the user gazing at the first auxiliary graphic.

6. The method according to claim 1, wherein the human-computer interface comprises a plurality of visual stimulus regions, the first signal comprises a plurality of electroencephalography signals that are generated in response to the plurality of visual stimulus regions stimulating vision of the user, and the plurality of electroencephalography signals separately indicate positional relationships between the first region and the plurality of visual stimulus regions.

7. The method according to claim 6, wherein the first region comprises a first sub-region and a second sub-region, the plurality of electroencephalography signals comprise a first sub-signal and a second sub-signal, the first sub-signal is an electroencephalography signal generated in response to the user gazing at the first sub-region, the second sub-signal is an electroencephalography signal generated in response to the user gazing at the second sub-region, and the first sub-signal precedes the second sub-signal; and
wherein that the first operational command is determined based on the first signal comprises that the first operational command is determined based on both the first sub-signal and the second sub-signal.

8. The method according to claim 6, wherein the first region is the display region of the operable object, and the executing the first operational command on the operable object comprises: executing a select operational command on the operable object.

9. A human-computer interaction apparatus, wherein the apparatus comprises:
a display, configured to cooperate with a processor to display a human-computer interface, wherein the human-computer interface comprises an operable object and a visual stimulus region;
a processor, configured to execute a first operational command on the operable object, wherein the first operational command is determined based on a first signal, the first signal is an electroencephalography signal generated in response to a user gazing at a first region, the first region is one of a plurality of regions around the visual stimulus region, different electroencephalography signals are generated in response to the user gazing at different regions of the plurality of regions, and the different electroencephalography signals indicate to execute different operational commands related to the operable object; and
wherein an included angle between a line of sight obtained in response to the user gazing at the first region and a line of sight obtained in response to the user gazing at a center point of the visual stimulus region is in a preset range.

10. The apparatus according to claim 9, wherein the different electroencephalography signals are evoked in different regions in a primary visual cortex in response to the user gazing at the different regions, and the first region is determined based on a region in which the first signal appears in the primary visual cortex.

11. The apparatus according to claim 9, wherein the visual stimulus region overlaps a display region of the operable object;
the plurality of regions are regions that are distributed in a plurality of directions centering around the visual stimulus region; and
the first region is a region distributed in a first direction, and the first direction is one of the plurality of directions.

12. The apparatus according to claim 11, wherein the regions in the plurality of directions comprise at least one auxiliary graphic, and the at least one auxiliary graphic is configured to indicate a position for gazing to the user;
the first region comprises a first auxiliary graphic of the at least one auxiliary graphic; and
the first signal is an electroencephalography signal generated in response to the user gazing at the first auxiliary graphic.

13. A human-computer interaction apparatus, comprising a processor and a memory, wherein the memory is configured to store a computer program, and the processor is configured to invoke the computer program to perform a method comprising:
displaying a human-computer interface, wherein the human-computer interface comprises an operable object and a visual stimulus region;
executing a first operational command on the operable object, wherein the first operational command is determined based on a first signal, the first signal is an electroencephalography signal generated in response to a user gazing at a first region, the first region is one of a plurality of regions around the visual stimulus region, different electroencephalography signals are generated in response to the user gazing at different regions of the plurality of regions, and the different electroencephalography signals indicate to execute different operational commands related to the operable object; and
wherein an included angle between a line of sight obtained in response to the user gazing at the first region and a line of sight obtained in response to the user gazing at a center point of the visual stimulus region is in a preset range.

14. The method according to claim 13, wherein the different electroencephalography signals are evoked in different regions in a primary visual cortex in response to the user gazing at the different regions, and the first region is determined based on a region in which the first signal appears in the primary visual cortex.

15. A non-transitory computer-readable storage medium, wherein the computer-readable storage medium stores a computer program, and the computer program is executed by a processor to implement a method comprising:
displaying a human-computer interface, wherein the human-computer interface comprises an operable object and a visual stimulus region;
executing a first operational command on the operable object, wherein the first operational command is determined based on a first signal, the first signal is an electroencephalography signal generated in response to a user gazing at a first region, the first region is one of a plurality of regions around the visual stimulus region, different electroencephalography signals are generated in response to the user gazing at different regions of the plurality of regions, and the different electroencephalography signals indicate to execute different operational commands related to the operable object; and wherein an included angle between a line of sight obtained in response to the user gazing at the first region and a line of sight obtained in response to the user gazing at a center point of the visual stimulus region is in a preset range.

16. The non-transitory computer-readable storage medium according to claim 15, wherein the different electroencephalography signals are evoked in different regions in a primary visual cortex in response to the user gazing at the different regions, and the first region is determined based on a region in which the first signal appears in the primary visual cortex.

17. The non-transitory computer-readable storage medium according to claim 15, wherein the visual stimulus region overlaps a display region of the operable object;

the plurality of regions are regions that are distributed in a plurality of directions centering around the visual stimulus region; and the first region is a region distributed in a first direction, and the first direction is one of the plurality of directions.

18. The human-computer interaction apparatus according to claim 13, wherein the visual stimulus region overlaps a display region of the operable object;

the plurality of regions are regions that are distributed in a plurality of directions centering around the visual stimulus region; and the first region is a region distributed in a first direction, and the first direction is one of the plurality of directions.

19. The human-computer interaction apparatus according to claim 13, wherein the regions in the plurality of directions comprise at least one auxiliary graphic, and the at least one auxiliary graphic is configured to indicate a position for gazing to the user;

the first region comprises a first auxiliary graphic of the at least one auxiliary graphic; and the first signal is an electroencephalography signal generated in response to the user gazing at the first auxiliary graphic.

20. The non-transitory computer-readable storage medium according to claim 15, wherein the regions in the plurality of directions comprise at least one auxiliary graphic, and the at least one auxiliary graphic is configured to indicate a position for gazing to the user;

the first region comprises a first auxiliary graphic of the at least one auxiliary graphic; and the first signal is an electroencephalography signal generated in response to the user gazing at the first auxiliary graphic.

* * * * *